US010925284B2

(12) United States Patent
Abraham et al.

(10) Patent No.: US 10,925,284 B2
(45) Date of Patent: Feb. 23, 2021

(54) GLYPHOSATE FORMULATIONS CONTAINING AMIDOALKYLAMINE SURFACTANTS

(71) Applicant: Monsanto Technology LLC, St. Louis, MO (US)

(72) Inventors: William Abraham, Wildwood, MO (US); John Hemminghaus, Crestwood, MO (US); Daniel R. Wright, St. Louis, MO (US); Shawn Zhu, Stormville, NY (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 15/657,461

(22) Filed: Jul. 24, 2017

(65) Prior Publication Data
US 2018/0042237 A1 Feb. 15, 2018

Related U.S. Application Data

(63) Continuation of application No. 12/568,167, filed on Sep. 28, 2009, now abandoned.

(60) Provisional application No. 61/100,961, filed on Sep. 29, 2008.

(51) Int. Cl.
A01N 57/20 (2006.01)
A01N 25/30 (2006.01)
A01N 47/30 (2006.01)
A01N 39/04 (2006.01)

(52) U.S. Cl.
CPC .................... A01N 57/20 (2013.01)

(58) Field of Classification Search
None
See application file for complete search history.

(56) References Cited

U.S. PATENT DOCUMENTS

| 3,799,758 | A | 3/1974 | Franz |
| 3,853,530 | A | 12/1974 | Franz |
| 3,977,860 | A | 8/1976 | Franz |
| 4,140,513 | A | 2/1979 | Prill |
| 4,315,765 | A | 2/1982 | Large |
| 4,405,531 | A | 9/1983 | Franz |
| 4,481,026 | A | 11/1984 | Prisbylla |
| 4,507,250 | A | 3/1985 | Bakel |
| 5,118,444 | A * | 6/1992 | Nguyen ............... A01N 25/30 252/387 |
| 5,863,863 | A * | 1/1999 | Hasebe ............... A01N 57/20 504/206 |
| 5,958,439 | A | 9/1999 | Gubelmann |
| 6,165,939 | A | 12/2000 | Agbaje et al. |
| 6,277,788 | B1 | 8/2001 | Wright |
| 6,365,551 | B1 | 4/2002 | Wright et al. |
| 6,455,473 | B2 | 9/2002 | Wright |
| 6,544,930 | B2 | 4/2003 | Wright |
| 6,667,276 | B1 | 12/2003 | Maier et al. |
| 6,747,164 | B2 | 6/2004 | Gustavsson et al. |
| 6,881,707 | B2 | 4/2005 | Howat et al. |
| 6,992,045 | B2 | 1/2006 | Xu et al. |
| 7,008,904 | B2 | 3/2006 | Crockett et al. |
| 7,049,270 | B2 | 5/2006 | Lennon et al. |
| 7,060,659 | B2 | 6/2006 | Killick et al. |
| 7,135,437 | B2 | 11/2006 | Pallas et al. |
| 8,236,730 | B2 | 8/2012 | Bramati et al. |
| 2002/0160918 | A1 | 10/2002 | Lewis et al. |
| 2003/0087764 | A1 | 5/2003 | Pallas et al. |
| 2003/0096708 | A1 | 5/2003 | Agbaje et al. |
| 2003/0176286 | A1 | 9/2003 | Gustavsson |
| 2004/0097372 | A1 | 5/2004 | Abraham et al. |
| 2005/0026781 | A1 | 2/2005 | Wright et al. |
| 2005/0261130 | A1 | 11/2005 | Lennon et al. |
| 2006/0019828 | A1 | 1/2006 | Becher et al. |
| 2006/0019830 | A1 | 1/2006 | Xu et al. |
| 2006/0040826 | A1 | 2/2006 | Eaton et al. |
| 2006/0094602 | A1 | 5/2006 | Killick et al. |
| 2006/0148648 | A1 | 7/2006 | Crockett et al. |

(Continued)

FOREIGN PATENT DOCUMENTS

| DE | 19953274 A1 | 5/2001 |
| WO | 9632839 A2 | 10/1996 |

(Continued)

OTHER PUBLICATIONS

Bergstrom et al., "Amido propyl amines—new adjuvant class for agrochemicals", The BCPC International Congress—Crop Science & Technology, 2005, pp. 459-464.
Akzo Nobel Surface Chemistry LLC Brochure by Akzo Nobel and Agro Applications, "Surface Chemistry Agro Applications", 2003 (4), 88 pages.
Product Overview Surfactants Europe, Akzo Nobel Surface Chemistry AB, 2006 (7), 42 pages.
Surfactant News, "Adsee C80W—A New Glyphosate Adjuvant", by Markus Jonsson, 2007, 1 page.
Muzyczko, T.M., et al., "Fatty Amidoamine Derivatives: N,N-Dimethyl-N-(3-alkylamidopropyl)amines and Their Salts," 1968, Journal of American Oil Chemists' Society, 45:720-725.
International Search Report and Written Opinion issued in PCT/US2009/058551 dated Jan. 31, 2011, 15 pages.

Primary Examiner — Erin E Hirt
(74) Attorney, Agent, or Firm — Stinson LLP

(57) ABSTRACT

An herbicidal composition comprising (a) glyphosate or a derivative thereof, (b) an amidoalkylamine surfactants having the general structure:

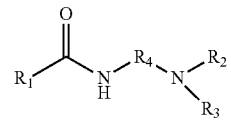

wherein $R_1$ is a hydrocarbyl having from about 1 carbon atoms to about 22 carbon atoms, and $R_2$, $R_3$, and $R_4$ are each independently hydrocarbyl having from about 1 carbon atom to about 6 carbon atoms; and (c) at least one co-surfactant.

27 Claims, 4 Drawing Sheets

(56) References Cited

U.S. PATENT DOCUMENTS

2006/0270556 A1    11/2006   Wright et al.
2010/0234228 A1     9/2010   Lennon et al.

FOREIGN PATENT DOCUMENTS

| | | |
|---|---|---|
| WO | 9700010 A1 | 1/1997 |
| WO | 9700126 A1 | 1/1997 |
| WO | 0030452 A1 | 6/2000 |
| WO | 008482 A1 | 2/2001 |
| WO | 0117358 A1 | 3/2001 |
| WO | 0132019 A1 | 5/2001 |
| WO | 0195720 A1 | 12/2001 |
| WO | 0221924 A2 | 3/2002 |
| WO | 0232227 A1 | 4/2002 |
| WO | 02069718 A2 | 9/2002 |
| WO | 02096199 A2 | 12/2002 |
| WO | 2004019681 A2 | 3/2004 |
| WO | 2006023431 A2 | 3/2006 |
| WO | 2006034426 A1 | 3/2006 |
| WO | 2006111563 A1 | 10/2006 |
| WO | 2006127501 A2 | 11/2006 |
| WO | 2008068214 A2 | 6/2008 |
| WO | 2009082675 A1 | 7/2009 |
| WO | 2011026800 A2 | 3/2011 |

\* cited by examiner

GLYPHOSATE FORMULATIONS CONTAINING AMIDOALKYLAMINE SURFACTANTS

This application is a continuation of U.S. application Ser. No. 12/568,167, filed Sep. 28, 2009 and claims the benefit of U.S. provisional application Ser. No. 61/100,961, filed Sep. 29, 2008, the entire contents of which are incorporated herein by reference.

FIELD OF THE INVENTION

The present invention generally relates to herbicidal compositions comprising glyphosate and more specifically, to herbicidal compositions comprising glyphosate and surfactant blends particularly tailored to increase the stability of and reduce the toxicity of the herbicidal compositions.

BACKGROUND OF THE INVENTION

N-phosphonomethylglycine ("glyphosate") is an effective post-emergent foliar-applied herbicide. In its acid form, the structure of glyphosate is:

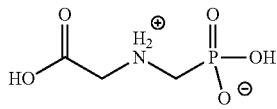

Since glyphosate in its acid form is relatively insoluble in water (1.16% by weight at 25° C.), it is typically formulated as a water-soluble salt.

Glyphosate is typically formulated as a monobasic, dibasic, or tribasic salt. Various salts of glyphosate, methods for preparing salts of glyphosate, formulations of glyphosate or its salts and methods of use of glyphosate or its salts for killing and controlling weeds and other plants are disclosed in U.S. Pat. No. 4,507,250 to Bakel, U.S. Pat. No. 4,481,026 to Prisbylla, U.S. Pat. No. 4,405,531 to Franz, U.S. Pat. No. 4,315,765 to Large, U.S. Pat. No. 4,140,513 to Prill, U.S. Pat. No. 3,977,860 to Franz, U.S. Pat. No. 3,853,530 to Franz, and U.S. Pat. No. 3,799,758 to Franz. The aforementioned patents are incorporated herein in their entirety by reference.

Typical glyphosate salts include, for example, the mono(isopropylammonium) ("IPA"), potassium, sodium, monoethanolammonium ("MEA"), trimethylsulfonium ("TMS"), ammonium, diammonium salts, n-propylamine, ethylamine, ethylenediamine, and hexamethylenediamine salts. The most widely used salt of glyphosate is the IPA salt. Commercial herbicides of Monsanto Company having the IPA salt of glyphosate as active ingredient include Roundup®, Roundup® Ultra, Roundup® Xtra, and Rodeo® herbicides. These are aqueous solution concentrate formulations and are generally diluted in water by the user prior to application to plant foliage. Commercially formulated TMS salt is used, for example, in Touchdown® herbicide of Zeneca (Syngenta).

Glyphosate salts are typically co-formulated with a surfactant to maximize herbicidal efficacy. However, the development of concentrated glyphosate formulations in the range of 480 g a.e./L to 540 g a.e./L is challenging due to the limited compatibility of surfactants at high glyphosate loadings. In this context and throughout this specification "g a.e./L" means grams acid equivalent per liter of solution, which refers to the concentration of glyphosate in its acid form. It is particularly challenging to formulate high load concentrates employing the potassium glyphosate salt or the diammonium glyphosate salt.

Current commercial diammonium glyphosate formulations typically contain from 360 g a.e./L to 369 g a.e./L glyphosate and employ relatively costly quaternary ammonium surfactants. The surfactant loadings are kept low in these formulations in order to maintain good eye toxicity profile and to be cost competitive. Problematically, low glyphosate loading coupled with low surfactant concentrations yields formulations characterized by reduced bioefficacy as compared to commercial formulations known in the art.

SUMMARY OF THE INVENTION

Among the various aspects of the present invention may be noted the provision of bio-efficacious herbicidal compositions having high glyphosate and surfactant loads. The herbicidal compositions of the invention are stable when formulated as herbicidal concentrates and when tank-mixed with co-herbicides. The present invention further provides herbicidal compositions characterized by reduced toxicity and reduced eye irritation. The herbicidal compositions of the invention are further compatible with a variety of glyphosate salts, for example, the potassium salt, the diammonium salt, the monoethanolamine salt, or combinations thereof.

Briefly, therefore, the present invention is directed to a liquid composition comprising glyphosate or a derivative thereof, wherein the glyphosate concentration is greater than 360 grams acid equivalent per liter. The composition further comprises an amidoalkylamine surfactant of structure (I):

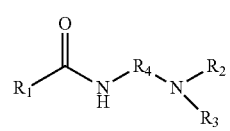

Structure (I)

wherein $R_1$ is hydrocarbyl or substituted hydrocarbyl having from 1 to about 22 carbon atoms, $R_2$ and $R_3$, are each independently hydrocarbyl or substituted hydrocarbyl having from 1 to about 6 carbon atoms, and $R_4$ is hydrocarbylene having from 1 to about 6 carbon atoms. The composition further comprises at least one co-surfactant comprising an alkoxylated tertiary amine, an alkoxylated quaternary amine, an alkoxylated tertiary etheramine, an alkoxylated quaternary etheramine, an alkoxylated etheramine oxide, an alkoxylated tertiary amine oxide, an alkoxylated alcohol, a phosphate ester of alkoxylated tertiary amine, a phosphate ester of alkoxylated etheramine, a phosphate ester of alkoxylated alcohol, or a combination thereof. The alkoxylated tertiary amine surfactant is of structure (II):

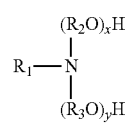

Structure (II)

wherein $R_1$ is hydrocarbyl or substituted hydrocarbyl having from about 4 to about 22 carbon atoms, $R_2$ and $R_3$ are each independently hydrocarbylene having 2, 3, or 4 carbon atoms, and the sum of x and y is an average value ranging from about 2 to about 50. The alkoxylated quaternary amine surfactant is of structure (III):

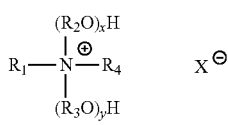

Structure (III)

wherein $R_1$ is hydrocarbyl or substituted hydrocarbyl having from 4 to about 22 carbon atoms, $R_2$ and $R_3$ are each independently hydrocarbylene having 2, 3, or 4 carbon atoms, $R_4$ is hydrocarbyl or substituted hydrocarbyl having from 1 to about 4 carbon atoms, the sum of x and y is an average value ranging from about 2 to about 50, and X is a charge balancing counter-anion. The alkoxylated tertiary etheramine surfactant is of structure (IV):

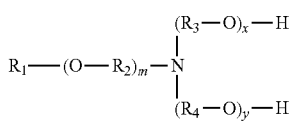

Structure (IV)

wherein $R_1$ is hydrocarbyl or substituted hydrocarbyl having from about 4 to about 22 carbon atoms; $R_2$, $R_3$ and $R_4$ are each independently hydrocarbylene having 2, 3, or 4 carbon atoms; m is an average number from about 1 to about 10; and the sum of x and y is an average value ranging from about 2 to about 60.

The alkoxylated quaternary etheramine surfactant is of structure (V):

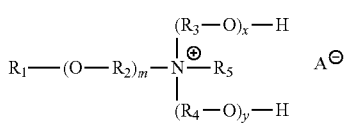

Structure (V)

wherein $R_1$ is hydrocarbyl or substituted hydrocarbyl having from about 4 to about 22 carbon atoms; $R_2$, $R_3$ and $R_4$ are each independently a hydrocarbylene having 2, 3, or 4 carbon atoms; m is an average number from about 1 to about 10; the sum of x and y is an average value ranging from about 2 to about 60; $R_5$ is hydrocarbyl or substituted hydrocarbyl having from 1 to about 4 carbon atoms; and A is a charge balancing counter-anion. The alkoxylated etheramine oxide surfactant is of structure (VI):

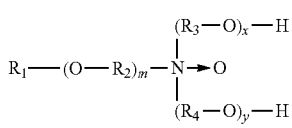

Structure (VI)

wherein $R_1$ is hydrocarbyl or substituted hydrocarbyl having from about 4 to about 22 carbon atoms; $R_2$, $R_3$ and $R_4$ are each independently hydrocarbylene having 2, 3, or 4 carbon atoms; m is an average number from about 1 to about 10; and the sum of x and y is an average value ranging from about 2 to about 60. The alkoxylated tertiary amine oxide surfactant is of structure (VII):

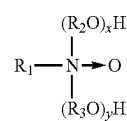

Structure (VII)

wherein $R_1$ is hydrocarbyl or substituted hydrocarbyl having from about 4 to about 22 carbon atoms; $R_2$ and $R_3$ are each independently hydrocarbylene having 2, 3, or 4 carbon atoms; and the sum of x and y is an average value ranging from about 2 to about 50. The alkoxylated alcohol surfactant is of structure (VIII):

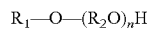

Structure (VIII)

wherein $R_1$ is hydrocarbyl or substituted hydrocarbyl having from about 4 to about 22 carbon atoms; $R_2$ is hydrocarbylene having 2, 3, or 4 carbon atoms; n is an average value ranging from about 2 to about 50. The phosphate ester of the alkoxylated tertiary amine surfactant is of structure (IXa) or structure (IXb):

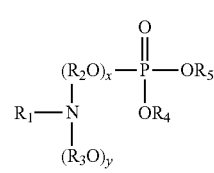

Structure (IXa)

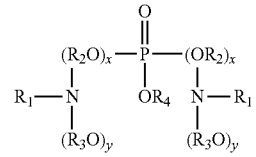

Structure (IXb)

wherein each $R_1$ is independently hydrocarbyl or substituted hydrocarbyl having from about 4 to about 22 carbon atoms, $R_2$ and $R_3$ are each independently hydrocarbylene having 2, 3, or 4 carbon atoms, the sum of each x and y group is independently an average value ranging from about 2 to about 60, and $R_4$ and $R_5$ are each independently hydrogen, hydrocarbyl or substituted hydrocarbyl having from 1 to about 6 carbon atoms. The phosphate ester of alkoxylated etheramine surfactant is of structure (Xa) or structure (Xb):

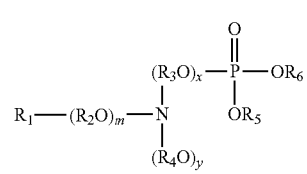

Structure (Xa)

Structure (Xb)

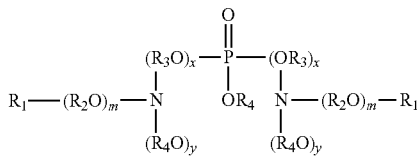

wherein each $R_1$ is independently hydrocarbyl or substituted hydrocarbyl having from about 4 to about 22 carbon atoms; each $R_2$, $R_3$ and $R_4$ are each independently hydrocarbylene having 2, 3, or 4 carbon atoms; each m is independently an average number from about 1 to about 10; the sum of each x and y group is independently an average value ranging from about 2 to about 60; and $R_5$ and $R_6$ are each independently hydrogen, hydrocarbyl or substituted hydrocarbyl having from 1 to about 6 carbon atoms. And the phosphate ester of alkoxylated alcohol surfactant is of structure (XIa) or (XIb):

Structure (XIa)

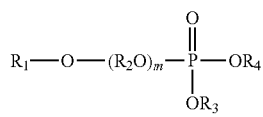

Strructure (XIb)

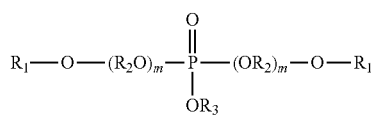

wherein each $R_1$ is independently hydrocarbyl or substituted hydrocarbyl having from about 4 to about 22 carbon atoms; each $R_2$ is independently hydrocarbylene having 2, 3, or 4 carbon atoms; each m is independently an average number from about 1 to about 60; and $R_3$ and $R_4$ are each independently hydrogen, a hydrocarbyl or substituted hydrocarbyl having from 1 to about 6 carbon atoms.

In another aspect, the present invention is directed to a liquid composition comprising glyphosate or a derivative thereof. The composition further comprises an amidoalkylamine surfactant of structure (I) as described above. The composition further comprises at least one co-surfactant comprising an alkoxylated tertiary etheramine of structure (IV), an alkoxylated quaternary etheramine of structure (V), an alkoxylated etheramine oxide of structure (VI), an alkoxylated tertiary amine oxide of structure (VII), a phosphate ester of alkoxylated tertiary amine of structure (IXa) or (IXb), a phosphate ester of alkoxylated etheramine of structure (Xa) or (Xb), a phosphate ester of alkoxylated alcohol of structure (XIa) or (XIb), each of which as described above, or a combination thereof.

In another aspect, the present invention is directed to a solid composition comprising glyphosate or a derivative thereof. The composition further comprises an amidoalkylamine surfactant of structure (I) as described above. The composition further comprises at least one co-surfactant comprising an alkoxylated tertiary amine of structure (II), an alkoxylated quaternary amine of structure (III), an alkoxylated tertiary etheramine of structure (IV), an alkoxylated quaternary etheramine of structure (V), an alkoxylated etheramine oxide of structure (VI), an alkoxylated tertiary amine oxide of structure (VII), an alkoxylated alcohol of structure (VIII), a phosphate ester of alkoxylated tertiary amine of structure (IXa) or (IXb), a phosphate ester of alkoxylated etheramine of structure (Xa) or (Xb), a phosphate ester of alkoxylated alcohol of structure (XIa) or (XIb), each of which as described above, or a combination thereof. The weight ratio of glyphosate grams acid equivalent to total surfactant in grams is from about 3:1 to about 5:1.

In yet another aspect, the present invention is directed to a solid composition comprising glyphosate or a derivative thereof. The composition further comprises an amidoalkylamine surfactant of structure (I) as described above. The composition further comprises at least one co-surfactant comprising an alkoxylated tertiary amine of structure (II), an alkoxylated quaternary amine of structure (III), an alkoxylated tertiary etheramine of structure (IV), an alkoxylated quaternary etheramine of structure (V), an alkoxylated etheramine oxide of structure (VI), an alkoxylated tertiary amine oxide of structure (VII), a phosphate ester of alkoxylated tertiary amine of structure (IXa) or (IXb), a phosphate ester of alkoxylated etheramine of structure (Xa) or (Xb), a phosphate ester of alkoxylated alcohol of structure (XIa) or (XIb), each of which as described above, or a combination thereof.

Other objects and features will be in part apparent and in part pointed out hereinafter.

DESCRIPTION OF THE EMBODIMENT(S) OF THE INVENTION

Figure 1:
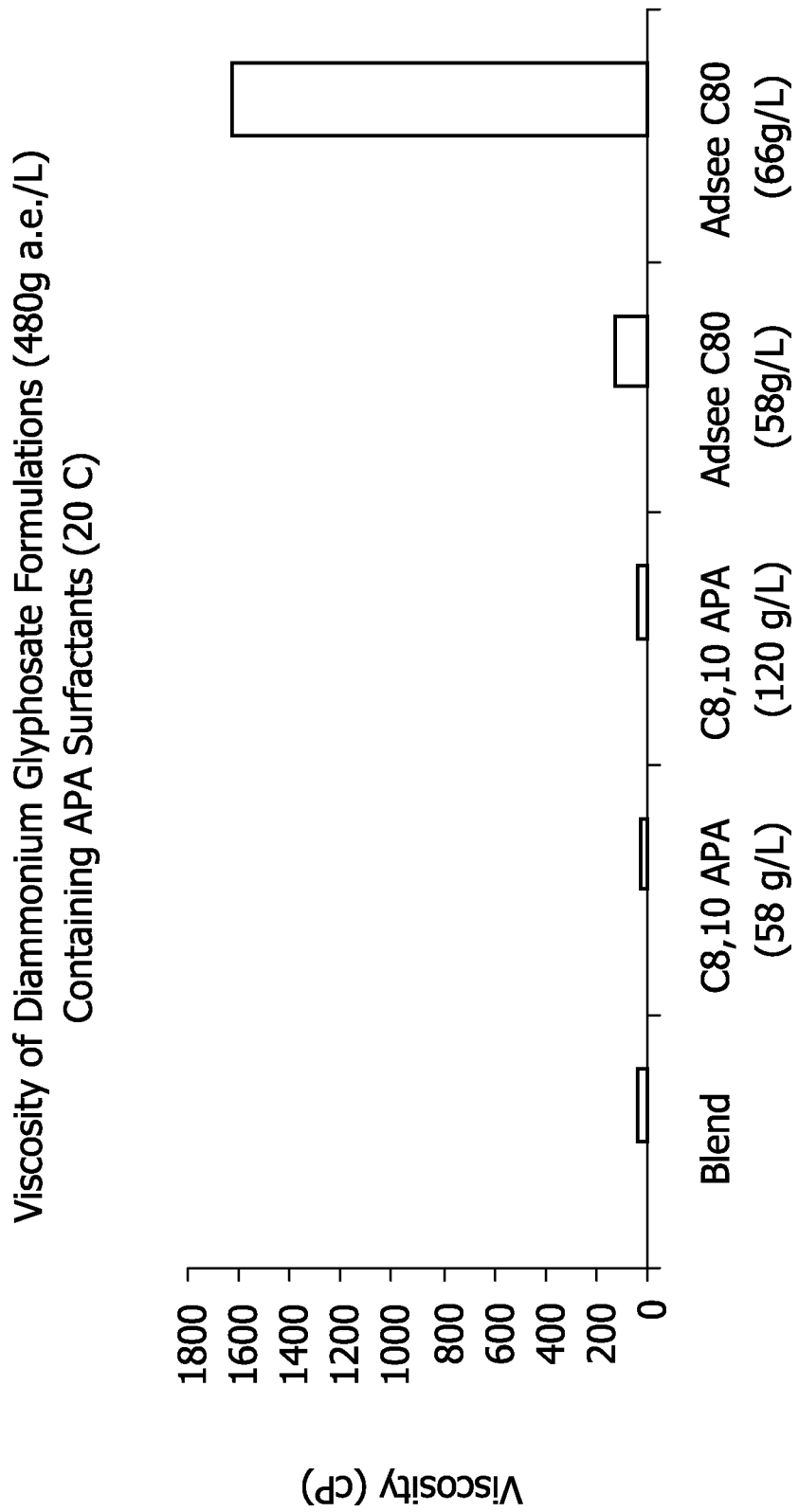
FIG. 1 is graph depicting the viscosity of diammonium glyphosate formulations as a function of surfactant type and surfactant loading. The data were obtained according to the method described in Example 1.

In general, the present invention is directed to an herbicidal composition comprising glyphosate or a salt or ester thereof, an amidoalkylamine surfactant, and at least one co-surfactant that is not, by itself, typically compatible in a high load glyphosate composition. That co-surfactant may be selected from among an alkoxylated tertiary amine, an alkoxylated quaternary amine, an alkoxylated etheramine, an alkoxylated quaternary etheramine, alkoxylated etheramine oxide, an alkoxylated tertiary amine oxide, an alkoxylated alcohol, a phosphate ester of alkoxylated tertiary amine, a phosphate ester of alkoxylated etheramine, and a phosphate ester of alkoxylated alcohol. In some embodiments, for example, the herbicidal composition comprises glyphosate or a salt or ester thereof, an amidoalkylamine surfactant, and at least one co-surfactant selected from among an alkoxylated tertiary amine, an alkoxylated quaternary amine, or a combination thereof. In some embodiments, the herbicidal composition comprises glyphosate or a salt or ester thereof, an amidoalkylamine surfactant, and at least one co-surfactant selected from among an alkoxylated etheramine, an alkoxylated quaternary etheramine, or a combination thereof. In some embodiments, the herbicidal composition comprises glyphosate or a salt or ester thereof, an amidoalkylamine surfactant, and at least one co-surfactant selected from among an alkoxylated etheramine oxide, an alkoxylated tertiary amine oxide, or a combination thereof. In some embodiments, the herbicidal composition comprises glyphosate or a salt or ester thereof, an amidoalkylamine surfactant, and an alkoxylated alcohol. In some embodiments, the herbicidal composition comprises glyphosate or a salt or ester thereof, an amidoalkylamine surfactant, and at least one co-surfactant selected from among a phosphate ester of alkoxylated tertiary amine, a phosphate ester of alkoxylated etheramine, and a phosphate ester of alkoxylated alcohol or a combination thereof. The composition may be an aqueous or solid herbicidal concentrate having a high load of glyphosate component or a ready to use formulation ("RTU") prepared by the dilution of herbicidal concentrates with water.

The high load glyphosate concentrates of the present invention are possible through the use of amidoalkylamine surfactants which have been discovered to be compatible with a wide variety of glyphosate salts. Advantageously, the surfactants have been discovered to be compatible with the diammonium salt, the potassium salt, and the monoethanolamine salt of glyphosate and enable the preparation of stable concentrates even at high concentrations of those glyphosate salts.

It has been further discovered that amidoalkylamine surfactants are efficient coupling agents to a variety of co-surfactants, for example, alkoxylated tertiary amine co-surfactants and/or alkoxylated quaternary amine co-surfactants, thereby allowing glyphosate salt loadings of 480 g a.e./L to 600 g a.e./L, coupled with high surfactant loadings of 120 g a.e./L to 150 g a.e./L, for example, a glyphosate salt loading of about 540 g a.e./L coupled with a surfactant loading of about 135 g a.e./L. High surfactant loadings of alkoxylated tertiary amine co-surfactants and/or alkoxylated quaternary amine co-surfactants combined with amidoalkylamine surfactants as coupling agents improves the formulation bioefficacy. Thus, formulations containing blends of amidoalkylamine surfactant coupling agents with at least one co-surfactant selected from among an alkoxylated tertiary amine, an alkoxylated quaternary amine, an alkoxylated etheramine, an alkoxylated quaternary etheramine, alkoxylated etheramine oxide, an alkoxylated tertiary amine oxide, an alkoxylated alcohol, a phosphate ester of alkoxylated tertiary amine, a phosphate ester of alkoxylated etheramine, and a phosphate ester of alkoxylated alcohol offer formulation stability as well as comparable, and in some cases, improved bioefficacy over current commercial standards.

It has further been discovered that employing a surfactant blend comprising amidoalkylamine surfactant coupled with at least one other co-surfactant improves the long term storage stability of high load glyphosate formulations. In this regard, high load glyphosate formulations comprising the surfactant blend of the present invention comprise a single phase (i.e., lack precipitates, flocculation, etc.) at temperatures ranging from about −20° C. to about 60° C. for durations of at least four weeks. The use of amidoalkylamine surfactants enables the preparation of high load glyphosate formulations comprising a higher proportion (relative to the total surfactant concentration) of co-surfactant, which further improves the long term stability of the herbicidal compositions of the present invention.

Moreover, the use of a surfactant blend comprising amidoalkylamine surfactant coupled with at least one other co-surfactant improves the compatibility of glyphosate compositions with co-herbicides, particularly when such co-herbicides are tank-mixed with dilute, ready to use formulations just prior to use.

It has yet been further discovered that the glyphosate formulations of the present invention comprising surfactant blends are characterized by decreased eye irritation, skin toxicity, and eco-toxicity as compared to surfactants in known glyphosate formulations. Therefore, amidoalkylamine surfactants can replace conventional surfactants, such as ethoxylated cocoamines, without adversely affecting glyphosate bioefficacy, and in some cases improving bioefficacy.

The glyphosate component of the compositions of the present invention is typically primarily responsible for plant suppression or death (i.e., bioefficacy) and is instrumental in imparting long-term herbicidal control. The glyphosate component comprises glyphosate acid and/or a derivative thereof. Derivatives include salts, esters, or compounds which are converted to glyphosate in plant tissues or which otherwise provide glyphosate anions. In this regard it is to be noted that the term "glyphosate," "glyphosate derivative," and "glyphosate component" when used herein is understood to encompass glyphosate, derivatives and mixtures thereof unless the context requires otherwise. Furthermore, the term "agronomically acceptable" includes glyphosate derivatives that allow agriculturally and economically useful herbicidal activity of a glyphosate anion in residential or industrial applications.

In the aqueous herbicidal compositions of the present invention, it is preferred that the glyphosate component predominantly comprise one or more of the more water-soluble salts of glyphosate. As used throughout this specification, the expression "predominantly comprises" means more than 50%, preferably at least about 75%, and more preferably at least about 90% by weight of the component of the herbicidal composition is made up of the specified compound(s). A glyphosate component predominantly comprising one or more of the various salts of glyphosate is preferred in part because their increased water solubility allows formulation of highly concentrated herbicidal compositions that can be easily transported and readily diluted with water in the preparation of sprayable RTU compositions at the site of intended use.

Suitable salts of glyphosate include monobasic, dibasic, or tribasic salts and include organic amines, alkali metal, alkaline earth metal, ammonium (e.g., monoammonium, diammonium, or triammonium) and sulfonium (e.g., monosulfonium, disulfonium, or trimethylsulfonium ("TMS") salts of glyphosate. The organic amine salts can comprise aliphatic or aromatic amine salts and can include primary, secondary, tertiary, or quaternary amine salts. Specific representative examples of such organic amine salts include isopropylamine ("IPA"), n-propylamine, ethylamine, dimethylamine ("DMA"), monoethanolamine ("MEA"), ethylenediamine and hexamethylenediamine salts of glyphosate. Specific representative examples of alkali metal salts include potassium and sodium salts of glyphosate. In accordance with more preferred embodiments of the invention, the glyphosate component predominantly comprises a salt of glyphosate selected from the potassium, monoammonium, diammonium, sodium, MEA, n-propylamine, IPA, ethylamine, DMA, ethylenediamine, hexamethylenediamine and TMS salts and combinations thereof. Of these, the MEA, diammonium, and potassium salts and combinations thereof are especially preferred.

Previous studies have indicated that the various salts of glyphosate have considerable differences in their compatibility with surfactants. In some instances, it has been shown that the potassium salt of glyphosate is advantageous due to the high solubility in water and the resulting high density that allows for higher loading of the active in formulations. However, potassium glyphosate offers limited compatibility with common surfactants used with glyphosate, for example, tertiary amine ethoxylates. One aspect of the current invention is, therefore, the capability of amidoalkyl amine surfactants to improve compatibility of potassium glyphosate with surfactants in a high load glyphosate formulation. The use of amidoalkylamine surfactants enables the preparation of glyphosate formulations with higher active and surfactant loadings, as well as increased levels of ethoxylation of tertiary amine surfactants compared to other coupling agents.

It has also been observed that certain of the other salts of glyphosate are difficult to formulate at loadings of, for example, about 540 g a.e./L, or higher, such as about 600 g a.e./L and higher in combination with a surfactant component. The other salts of glyphosate have been observed to offer better compatibility with surfactants compared to the potassium salt. For example, monoethanolamine (MEA) glyphosate has been observed to be more compatible with a wider variety of surfactants, particularly ethoxylated tertiary amines. However, the limited solubility and density of the MEA salt of glyphosate is a limiting factor in the formulation of a liquid herbicidal concentrate. In this regard, blends of two or more salts of glyphosate may allow for the preparation of highly loaded formulations containing amidoalkylamine coupling agents blended with a primary surfactant at higher levels than when formulated with potassium salt of glyphosate alone.

In some embodiments, the herbicidal composition of the present invention comprises a blend of the potassium salt of glyphosate and the ammonium salt of glyphosate. In other embodiments, the herbicidal composition of the present invention comprises a blend of the potassium salt of glyphosate and the monoethanolamine salt of glyphosate. The weight ratio of the potassium salt of glyphosate in grams acid equivalent to the monoethanolamine salt of glyphosate in grams acid equivalent may be between about 1:1 to about 4:1, such as about 7:3. In some preferred embodiments, the weight ratio of the potassium salt of glyphosate in grams acid equivalent to the monoethanolamine salt of glyphosate in grams acid equivalent is about 7:3, which enables weight ratios of ethoxylated tertiary amine surfactants in grams to amido alkylamine coupling agents in grams to vary from at least about 60:40, to at least about 65:35, and in some cases to at least about 70:30.

The herbicidal compositions of the present invention can be formulated as aqueous solutions. The term "aqueous," as used herein, refers to compositions comprising water in an amount that renders it the predominant solvent. "Aqueous" is not intended to exclude the presence of nonaqueous (i.e., organic) solvents, as long as water is present. Examples of suitable nonaqueous solvents include toluene, xylenes, petroleum naphtha, tetrahydrofurfuryl alcohol, ethylene glycol, polyethylene glycol, propylene glycol, ethanol, and hexanol.

The concentration of the glyphosate component in an aqueous herbicidal concentrate according to the present invention is typically at least about 300 grams acid equivalent per liter ("g a.e./L"), such as at least about 360 g a.e./L, such as at least about 390 g a.e./L. In preferred compositions of the invention, glyphosate concentration is not lower than 400 g a.e./L or about 420 g a.e./L, in particularly preferred compositions not lower than about 480 g a.e./L, or even about 540 g a.e./L, for example about 480 to about 540 g a.e./L, or about 480 to about 600 g a.e./L, or more. Accordingly, the concentration of the glyphosate component in a herbicidal concentrate is typically between about 300 g a.e./L and about 600 g a.e./L, preferably between about 420 g a.e./L and about 600 g a.e./L, even more preferably between about 480 g a.e./L and about 540 g a.e./L. It is believed that the upper limit of glyphosate concentration in a storage-stable surfactant-containing composition of the invention is in excess of about 650 g a.e./L, e.g., to about 700 g a.e./L, this limit being a consequence of the solubility limit of glyphosate and glyphosate salts in water, compounded by further limitation due to the presence of surfactant.

The solid concentrate compositions of the invention preferably comprise glyphosate or a derivative thereof in a concentration of greater than 30% by weight acid equivalent of the composition, such as from about 30% to about 90% by weight acid equivalent of the composition, such as from about 40% to about 90% by weight acid equivalent of the composition, more preferably from about 50% to about 80% by weight acid equivalent of the composition.

The present invention is further directed to RTU formulations prepared by diluting herbicidal concentrates with appropriate amounts of water. The concentration of the glyphosate component in aqueous RTU compositions of the present invention is typically at least about 1 g a.e./L, and generally from about 1 g a.e./L to about 50 g a.e./L. In order to provide more economical RTU formulations providing prolonged herbicidal activity, the concentration of the glyphosate component in the RTU composition is more preferably from about 5 g a.e./L to about 20 g a.e./L.

The compositions of the present invention comprise one or more amidoalkylamine surfactants added to the formulation to enhance the stability of high load glyphosate concentrates and to enhance the bioefficacy when combined with at least one other co-surfactant. The amidoalkylamine surfactants have the general structure (I):

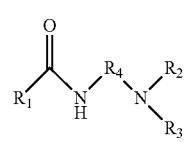

Structure (I)

wherein $R_1$ is a hydrocarbyl or substituted hydrocarbyl having from 1 to about 22 carbon atoms, $R_2$ and $R_3$ are each independently hydrocarbyl or substituted hydrocarbyl having from 1 to about 6 carbon atoms and $R_4$ is hydrocarbylene or substituted hydrocarbylene having from 1 to about 6 carbon atoms.

$R_1$ is preferably an alkyl or substituted alkyl having an average value of carbon atoms between about 4 to about 20 carbon atoms, preferably an average value between about 4 and about 18 carbon atoms, more preferably an average value from about 4 to about 12 carbon atoms, more preferably an average value from about 5 to about 12 carbon atoms, even more preferably an average value from about 6 to about 12 carbon atoms, and still more preferably an average value from about 6 to about 10 carbon atoms. The $R_1$ alkyl group may be derived from a variety of sources that provide alkyl groups having from about 4 to about 18 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). In some embodiments, the amidoalkylamine surfactant component may comprise a blend of amidoalkylamines having alkyl chains of various lengths from about 5 carbon atoms to about 12 carbon atoms. For example, depending upon the source of the $R_1$ alkyl group, an amidoalkylamine surfactant component may comprise a blend of surfactants having $R_1$ groups that are 5 carbon atoms in length, 6 carbon atoms in length, 7 carbon atoms in length, 8 carbon atoms in length, 9 carbon atoms in length, 10 carbon atoms in length, 11 carbon atoms in length, and 12 carbon atoms in length, longer carbon chains, and combinations thereof. In other embodiments, the amidoalkylamine surfactant component may comprise a blend of surfactants having $R_1$ groups that are 5 carbon atoms in length, 6 carbon atoms in length, 7 carbon atoms in length, and 8 carbon atoms in length. In some alternative embodiments, the amidoalkylamine surfactant component may comprise a blend of surfactants having $R_1$ groups that are 6 carbon atoms in length, 7 carbon atoms in length, 8 carbon atoms in length, 9 carbon atoms in length, and 10 carbon atoms in length. In other embodiments, the amidoalkylamine surfactant component may comprise a blend of surfactants having $R_1$ groups that are 8 carbon atoms in length, 9 carbon atoms in length, 10 carbon atoms in length, 11 carbon atoms in length, and 12 carbon atoms in length.

$R_2$ and $R_3$ are independently preferably an alkyl or substituted alkyl having from 1 to about 4 carbon atoms. $R_2$ and $R_3$ are most preferably independently an alkyl having from 1 to about 4 carbon atoms, and most preferably methyl. $R_4$ is preferably an alkylene or substituted alkylene having from 1 to about 4 carbon atoms. $R_4$ is most preferably an alkylene having from 1 to about 4 carbon atoms, and most preferably n-propylene.

In one preferred amidoalkylamine surfactant, $R_1$ is $C_{6-10}$, i.e., an alkyl group having 6 carbon atoms, 7 carbon atoms, 8 carbon atoms, 9 carbon atoms, 10 carbon atoms, or a blend of any of these, i.e., from about 6 carbon atoms to about 10 carbon atoms; $R_2$ and $R_3$ are each methyl; and $R_4$ is n-propylene (i.e., $C_{6-10}$ amidopropyl dimethylamine).

Based on experimental evidence to date, amidoalkylamine surfactants having the general structure (I) have been shown to be compatible with the various water soluble salts of glyphosate, particularly potassium, isopropylammonium, ammonium, monoethanolamine, and diammonium salts of glyphosate, and combinations of glyphosate salts, such as a blend of potassium glyphosate and monoethanolamine glyphosate, or a blend of potassium glyphosate and ammonium glyphosate. Moreover, amidoalkylamine surfactants having the general structure (I) have been discovered to enhance the stability of highly loaded glyphosate formulations when coupled with, for example, alkoxylated tertiary amine co-surfactants, alkoxylated quaternary amine co-surfactants, and a variety of additional co-surfactants, as measured by cloud point and long term stability studies. The amidoalkylamine surfactants have also been shown to enhance the stability of tank-mixed, ready to use formulations that are combined with co-herbicides. The amidoalkylamine surfactants have also been shown to enhance the bioefficacy of glyphosate formulations when coupled with, for example, alkoxylated tertiary amine co-surfactants, alkoxylated quaternary amine co-surfactants, or any of a wide variety of other co-surfactants. Finally, the use of amidoalkylamines within a surfactant blend advantageously reduces eye and skin toxicity of the herbicidal concentrates of the present invention compared to surfactants that are currently used in commercially available glyphosate products.

In herbicidal compositions of the present invention, the above-described amidoalkylamine surfactant acts a coupling agent in combination with an additional surfactant component. In some embodiments, the additional surfactant component is selected from among an alkoxylated tertiary amine, an alkoxylated quaternary amine, or a combination thereof.

Alkoxylated tertiary amine co-surfactants of the present invention have the general structure (II):

Structure (II)

wherein $R_1$ is a hydrocarbyl or substituted hydrocarbyl having from about 4 to about 22 carbon atoms, $R_2$ and $R_3$ are each independently hydrocarbylene having 2, 3, or 4 carbon atoms (e.g., ethylene, propylene or isopropylene), and the sum of x and y is an average value ranging from about 2 to about 50.

$R_1$ is preferably an alkyl having from about 4 to about 22 carbon atoms, more preferably from about 8 to about 18 carbon atoms, and still more preferably from about 12 to about 18 carbons atoms, for example coco or tallow. $R_1$ is most preferably tallow. $R_2$ and $R_3$ are preferably ethylene. The sum of x and y is preferably an average value ranging from about 2 to about 22, more preferably between about 10 and about 20, for example, about 15.

Specific alkoxylated tertiary amine co-surfactants for use in the herbicidal compositions of the present invention include, for example, Ethomeen T/12, Ethomeen T/20, Ethomeen T/25, Ethomeen T/30, Ethomeen T/60, Ethomeen C/12, Ethomeen C/15, and Ethomeen C/25, each of which are available from Akzo Nobel.

Alkoxylated quaternary amine co-surfactants of the present invention have the general structure (III):

Structure (III)

wherein $R_1$, $R_2$, $R_3$, x and y are as described above for the alkoxylated tertiary amine co-surfactants of structure (II), i.e., $R_1$ is a hydrocarbyl or substituted hydrocarbyl having from about 4 to about 22 carbon atoms, $R_2$ and $R_3$ are each independently hydrocarbylene having 2, 3, or 4 carbon atoms (e.g., ethylene, propylene or isopropylene), and the sum of x and y is an average value ranging from about 2 to about 50. $R_4$ is preferably a hydrocarbyl or substituted hydrocarbyl having from 1 to about 4 carbon atoms, more preferably methyl. X is a charge balancing counter-anion, such as sulfate, chloride, bromide, nitrate, among others.

$R_1$ is preferably an alkyl having from about 4 to about 22 carbon atoms, more preferably from about 8 to about 18 carbon atoms, and still more preferably from about 12 to about 18 carbons atoms, for example coco or tallow. $R_1$ is most preferably tallow. $R_2$ and $R_3$ are preferably ethylene. The sum of x and y is preferably an average value ranging from about 2 to about 22, more preferably between about 10 and about 20, for example, about 15.

Specific alkoxylated quaternary amine co-surfactants for use in the herbicidal composition of the present invention include, for example, Ethoquad T/12, Ethoquad T/20, Ethoquad T/25, Ethoquad C/12, Ethoquad C/15, and Ethoquad C/25, each of which are available from Akzo Nobel.

With regard to the surfactant blend itself, the use of the amidoalkylamine surfactant as a coupling agent enables the preparation of high load glyphosate herbicidal concentrates with higher proportions of alkoxylated tertiary amine co-surfactants and alkoxylated quaternary amine co-surfactants of improved stability compared to formulations comprising conventional coupling agents. Stated another way, increasing the proportion of the alkoxylated tertiary amine co-surfactants and alkoxylated quaternary amine co-surfactants normally decreases the stability of a high load glyphosate formulation when a conventional coupling agent is employed. The amidoalkylamine coupling agent enables the preparation of high load glyphosate formulations having higher proportions of alkoxylated tertiary amine co-surfactants and alkoxylated quaternary amine co-surfactants that are stable as illustrated by long term storage stability and cloud point studies. With regard to the surfactant blend, a concentration ratio of the amidoalkylamine surfactant in g/L to any of (1) the alkoxylated tertiary amine co-surfactant in g/L, (2) the alkoxylated quaternary amine co-surfactant in g/L, or (3) the sum of the combination of the alkoxylated tertiary amine co-surfactant and the alkoxylated quaternary amine co-surfactant in g/L may vary from 10:1 to about 1:10, more preferably from 8:1 to about 1:8, more preferably from 5:1 to about 1:5, and most preferably from 2:1 to about 1:2. Preferably, the concentration ratio of the amidoalkylamine surfactant in g/L to any of (1) the alkoxylated tertiary amine co-surfactant in g/L, (2) the alkoxylated quaternary amine co-surfactant in g/L, or (3) the sum of the combination of the alkoxylated tertiary amine co-surfactant and the alkoxylated quaternary amine co-surfactant in g/L is less than about 45:55, more preferably less than about 40:60, even more preferably less than about 35:65.

The pH of the herbicidal composition of the present invention is a factor in stability, cloud point, compatibilization of glyphosate salts with the surfactants used, and compatibilization with co-herbicides, if added. In this regard, the pH of an herbicidal composition comprising potassium glyphosate, for example, as its predominant glyphosate component may be from about 4 to about 8, such as from about 4.5 to about 5.5. In other embodiments, the pH of a herbicidal composition comprising diammonium glyphosate as its predominant glyphosate component may be from about 4 to about 8, such as from about 5 to about 7, such as from about 5.5 to about 6.5.

pH adjusting agents for acidic adjustment include mineral acids such as, for example, hydrochloric acid, nitric acid or sulfuric acid, and organic acids such as, for example, acetic acid or dicarboxylic acids. pH adjusting agents for alkaline adjustment include, for example, sodium hydroxide, potassium hydroxide, ammonia, and organic bases, such as IPA, MEA, and DMA.

The herbicidal compositions may further comprise other conventional adjuvants, excipients, or additives known to those skilled in the art. These other additives or ingredients may be introduced into the compositions of the present invention to provide or improve certain desired properties or characteristics of the formulated product. Hence, the herbicidal composition may further comprise one or more additional ingredients selected from, without limitation, foam-moderating agents, surfactants, preservatives or anti-microbials, antifreeze agents, solubility-enhancing agents, dyes, pH adjusters and thickening agents.

Suitable surfactants are known to those skilled in the art and include cationic, nonionic, and anionic surfactants. These surfactants may be included in the herbicidal compositions of the present invention so long as they do not adversely affect the stability or compatibility of the surfactant component with the remainder of the glyphosate formulation. In some instances, the herbicidal compositions of the present invention comprise glyphosate or a glyphosate derivative, an amidoalkylamine coupling agent, and at least one of a compatible cationic, nonionic, or anionic co-surfactant. In other instances, the herbicidal compositions of the present invention comprise glyphosate or a glyphosate derivative, an amidoalkylamine coupling agent, an additional surfactant component selected from among an alkoxylated tertiary amine, an alkoxylated quaternary amine, or a combination thereof, and at least one of a compatible cationic, nonionic, or anionic co-surfactant. The herbicidal compositions of the present invention may also comprise glyphosate or a glyphosate derivative, an amidoalkylamine coupling agent, and at least one of a compatible cationic, nonionic, or anionic co-surfactant.

Suitable classes of cationic surfactants include primary, secondary and tertiary alkylamines, primary, secondary and tertiary alkylaminium salts in which an amine group is substantially protonated in the formulation, onium salts such as quaternary alkylammonium salts, and mixtures thereof. A wide variety of primary, secondary, tertiary, quaternary and zwitterionic alkylamine and alkylammonium salt surfactants can be utilized in the practice of the present invention. A subclasses of primary, secondary, and tertiary alkylamine surfactants for use in the present invention are alkyl amine oxides, alkyletheramines, and alkyletheramine oxides as disclosed in U.S. Pat. No. 5,750,468 (to Wright).

In some embodiments, herbicidal compositions of the present invention comprise an amidoalkylamine surfactant as a coupling agent for a co-surfactant component selected from among alkoxylated tertiary etheramine surfactants or alkoxylated quaternary etheramine surfactants.

Alkoxylated tertiary etheramine co-surfactant for use in the herbicidal compositions of the present invention have the general structure (IV):

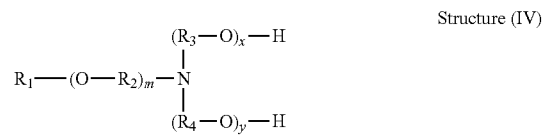

Structure (IV)

wherein $R_1$ is a hydrocarbyl or substituted hydrocarbyl having from about 4 to about 22 carbon atoms; $R_2$, $R_3$ and $R_4$ are each independently a hydrocarbylene having 2, 3, or 4 carbon atoms (e.g., ethylene, propylene or isopropylene); m is an average number from about 1 to about 10; and the sum of x and y is an average value ranging from about 2 to about 60.

$R_1$ is preferably an alkyl having from about 4 to about 22 carbon atoms, more preferably from about 8 to about 18 carbon atoms, from about 10 to about 16 carbon atoms, from about 12 to about 18 carbons atoms, or from about 10 to about 14 carbon atoms. Sources of the $R_1$ group include, for example, coco or tallow, or $R_1$ may be derived from synthetic hydrocarbyls, such as decyl, dodedecyl, tridecyl, tetradecyl, hexadecyl, or octadecyl groups. M is preferably from about 1 to 5, such as 2 to 3. $R_2$, $R_3$ and $R_4$ may independently be ethylene, propylene, isopropylene, and are preferably ethylene. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated tertiary etheramine co-surfactants for use in the herbicidal composition of the present invention include, for example, any of the TOMAH E-Series surfactants, such as TOMAH E-14-2, TOMAH E-14-5, TOMAH E-17-2, TOMAH E-17-5, TOMAH E-19-2, TOMAH E-18-2, TOMAH E-18-5, TOMAH E-18-15, TOMAH E-S-2, TOMAH E-S-15, TOMAH E-T-2, TOMAH E-T-5, and TOMAH E-T-15, all available from Air Products and Chemicals, Inc. Another example is SURFONIC AGM 550 available from Huntsman Petrochemical Corporation.

Alkoxylated quaternary etheramine co-surfactants for use in the herbicidal compositions of the present invention have the general structure (V):

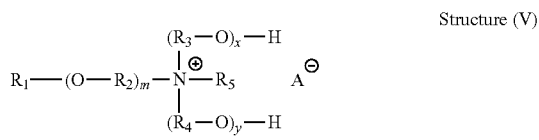

Structure (V)

wherein $R_1$ is a hydrocarbyl or substituted hydrocarbyl having from about 4 to about 22 carbon atoms; $R_2$, $R_3$ and $R_4$ are each independently is a hydrocarbylene having 2, 3, or 4 carbon atoms (e.g., ethylene, propylene or isopropylene); m is an average number from about 1 to about 10; and the sum of x and y is an average value ranging from about 2 to about 60. $R_5$ is preferably a hydrocarbyl or substituted hydrocarbyl having from 1 to about 4 carbon atoms, more preferably methyl. A is a charge balancing counter-anion, such as sulfate, chloride, bromide, nitrate, among others.

$R_1$ is preferably an alkyl having from about 4 to about 22 carbon atoms, more preferably from about 8 to about 18 carbon atoms, from about 10 to about 16 carbon atoms, from about 12 to about 18 carbons atoms, or from about 12 to about 14 carbon atoms. Sources of the $R_1$ group include, for example, coco or tallow, or $R_1$ may be derived from synthetic hydrocarbyls, such as decyl, dodedecyl, tridecyl, tetradecyl, hexadecyl, or octadecyl groups. M is preferably from about 1 to 5, such as 2 to 3. $R_2$, $R_3$ and $R_4$ may independently be ethylene, propylene, isopropylene, and are preferably ethylene. $R_5$ is preferably methyl. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated quaternary etheramine co-surfactants for use in the herbicidal composition of the present invention include, for example, TOMAH Q-14-2, TOMAH Q-17-2, TOMAH Q-17-5, TOMAH Q-18-2, TOMAH Q-S, TOMAH Q-S-80, TOMAH Q-D-T, TOMAH Q-DT-HG, TOMAH Q-C-15, and TOMAH Q-ST-50, all available from Air Products and Chemicals, Inc.

Preferred subclasses of zwitterionic or amphoteric alkylammonium salts for use in the present invention are amino acid derivatives such as alkyl, dialkyl or alkyl lower-alkyl glycines, beta-alanines, aspartates, and the like. Preferred alkylammonium salts are quaternary alkylammonium salts. Classes of quaternary alkylammonium salts useful in the present invention include quaternized (e.g., N-methyl) alkylamines, quaternized polyoxyalkylene alkylamines, quaternary salts of pyridines, quaternary salts of carboxylated imidazolines (open and closed chain) and trialkyl betaines. Trialkylamine oxides are a class of compounds which form quaternary ammonium hydroxide salts upon addition to water and are also useful in the practice of the present invention. Other general classes of quaternary alkylammonium and alkylaminium salt surfactants useful in the practice of the present invention will be known to and readily ascertainable by those skilled in the art.

Nonionic surfactants suitable for the practice of the present invention include, without restriction, polyoxyalkylene primary and secondary $C_{8-20}$ alkylethers, alkoxylated acetylenic diols, polyoxyalkylene mono- and di($C_{8-20}$ alkyl)phenylethers, polyoxyalkylene di- and tristyrylphenylethers, polyoxyalkylene $C_{8-20}$ fatty acid esters, alkoxylated alcohols such as polyoxyalkylene $C_{8-20}$ alcohols, alkoxylated vegetable oils, alkoxylated castor oil, block copolymers of ethylene oxide and propylene oxide and $C_{2-6}$ alkyl adducts thereof, glycerol fatty acid esters, sorbitan $C_{8-20}$ mono-, di- and tri($C_{8-20}$ fatty acid) esters, polyoxyalkylene sorbitan mono-, di- and tri($C_{8-20}$ fatty acid) esters, sucrose esters, $C_{8-20}$ alkyl polyglycosides, alkoxylated etheramine oxide surfactants, and alkoxylated tertiary amine oxide surfactants.

In some instances, herbicidal compositions of the present invention comprise an amidoalkylamine surfactant as a coupling agent for a co-surfactant component selected from among alkoxylated etheramine oxide co-surfactants or alkoxylated tertiary amine oxide co-surfactants.

Alkoxylated etheramine oxide co-surfactants for use in the herbicidal compositions of the present invention have the general structure (VI):

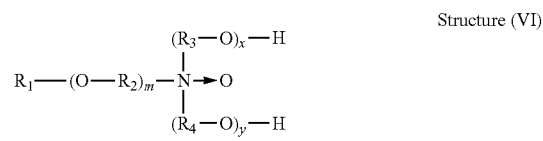

Structure (VI)

wherein $R_1$ is a hydrocarbyl or substituted hydrocarbyl having from about 4 to about 22 carbon atoms; $R_2$, $R_3$ and $R_4$ are each independently a hydrocarbylene having 2, 3, or 4 carbon atoms (e.g., ethylene, propylene or isopropylene); m is an average number from about 1 to about 10; and the sum of x and y is an average value ranging from about 2 to about 60.

$R_1$ is preferably an alkyl having from about 4 to about 22 carbon atoms, more preferably from about 8 to about 18 carbon atoms, from about 10 to about 16 carbon atoms, from about 12 to about 18 carbons atoms, or from about 12 to about 14 carbon atoms. Sources of the $R_1$ group include, for example, coco or tallow, or $R_1$ may be derived from synthetic hydrocarbyls, such as decyl, dodecyl, tridecyl, tetradecyl, hexadecyl, or octadecyl groups. M is preferably from about 1 to 5, such as 2 to 3. $R_2$, $R_3$ and $R_4$ may independently be ethylene, propylene, isopropylene, and are preferably ethylene. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated etheramine oxide co-surfactants for use in the herbicidal composition of the present invention include, for example, any of the TOMAH AO-series of surfactants, such as TOMAH AO-14-2, TOMAH AO-728, TOMAH AO-17-7, TOMAH AO-405, and TOMAH AO-455, all available from Air Products and Chemicals, Inc.

Alkoxylated tertiary amine oxide co-surfactants of the present invention have the general structure (VII):

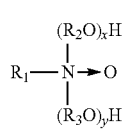

Structure (VII)

wherein $R_1$ is a hydrocarbyl or substituted hydrocarbyl having from about 4 to about 22 carbon atoms, $R_2$ and $R_3$ are each independently hydrocarbylene having 2, 3, or 4 carbon atoms (e.g., ethylene, propylene or isopropylene), and the sum of x and y is an average value ranging from about 2 to about 50.

$R_1$ is preferably an alkyl having from about 4 to about 22 carbon atoms, more preferably from about 8 to about 18 carbon atoms, and still more preferably from about 12 to about 18 carbons atoms, for example coco or tallow. $R_1$ is most preferably tallow. $R_2$ and $R_3$ are preferably ethylene. The sum of x and y is preferably an average value ranging from about 2 to about 22, more preferably between about 10 and about 20, for example, about 15.

Specific alkoxylated tertiary amine oxide co-surfactants for use in the herbicidal compositions of the present invention include, for example, any of the AROMOX series of surfactants, including AROMOX C/12, AROMOX C/12W, AROMOX DMC, AROMOX DM16, AROMOX DMHT, and AROMOX T/12 DEG, all available from Akzo Nobel.

In some instances, herbicidal compositions of the present invention comprise an amidoalkylamine surfactant as a coupling agent for an alkoxylated alcohol surfactant co-surfactant component.

Alkoxylated alcohol co-surfactants of the present invention may have the general structure (VIII):

$R_1\text{—}O\text{—}(R_2O)_n H$    Structure (VIII)

wherein $R_1$ is a hydrocarbyl or substituted hydrocarbyl having from about 4 to about 22 carbon atoms; $R_2$ is a hydrocarbylene having 2, 3, or 4 carbon atoms (e.g., ethylene, propylene or isopropylene); and n is an average value ranging from about 2 to about 50.

$R_1$ is preferably an alkyl group having from about 4 to about 22 carbon atoms, more preferably from about 8 to about 18 carbon atoms, and still more preferably from about 12 to about 18 carbons atoms. $R_1$ may be branched or linear. Preferably, $R_1$ is linear. The $R_1$ alkyl group may be derived from a variety of sources that provide alkyl groups having from about 4 to about 22 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). Sources of the $R_1$ group include, for example, coco or tallow, or $R_1$ may be derived from synthetic hydrocarbyls, such as decyl, dodedecyl, tridecyl, tetradecyl, hexadecyl, or octadecyl groups. The $R_1$ alkyl chain in a population of alkoxylated alcohol co-surfactants typically comprises alkyl chains having varying length, for example, from 12 to 16 carbons in length, or from 16 to 18 carbons in length, on average. Most preferably, the $R_1$ alkyl chain comprises predominantly 12 to 16 carbon atoms. $R_2$ is preferably ethylene. The value of n is preferably an average between about 2 and about 30, more preferably between about 2 and about 20, even more preferably between about 2 and about 10.

Specific alkoxylated alcohol co-surfactants for use in the herbicidal compositions of the present invention include, for example, Ethylan 6830 available from Akzo Nobel or Surfonic L24-7 and Surfonic L12-8 available from Huntsman.

Anionic surfactants useful as components of the stabilizing system of compositions of the include, without restriction, $C_{8-20}$ alkyl carboxylates including fatty acids, $C_{8-20}$ alcohol sulfates, phosphate esters of alkoxylated tertiary amines, phosphate esters of alkoxylated etheramines, phosphate esters of alkoxylated alcohols such as $C_{8-20}$ alcohol phosphate mono- and diesters, $C_{8-20}$ alcohol and ($C_{8-20}$ alkyl)phenol polyoxyethylene ether carboxylates, sulfates and sulfonates, $C_{8-20}$ alcohol and ($C_{8-20}$ alkyl)phenol polyoxyethylene phosphate mono- and diesters, $C_{8-20}$ alkylbenzene sulfonates, naphthalene sulfonates and formaldehyde condensates thereof, lignosulfonates, $C_{8-20}$ alkyl sulfosuccinates and sulfosuccinamates, $C_{8-20}$ alkyl polyoxyethylene sulfosuccinates and sulfosuccinamates, and $C_{8-20}$ acyl glutamates, sarcosinates, isethionates and taurates.

In some embodiments, herbicidal compositions of the present invention comprise an amidoalkylamine surfactant as a coupling agent for a co-surfactant component selected from among phosphate esters of alkoxylated tertiary amine co-surfactants or phosphate esters of alkoxylated etheramine co-surfactants.

Phosphate esters of alkoxylated tertiary amine co-surfactants for use in the herbicidal compositions of the present invention have the general structures (IXa) and (IXb):

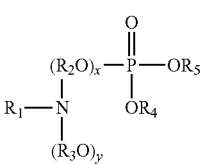

Structure (IXa)

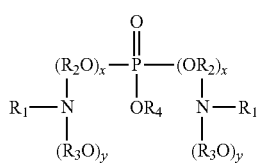

Structure (IXb)

wherein each $R_1$ is independently a hydrocarbyl or substituted hydrocarbyl having from about 4 to about 22 carbon atoms, $R_2$ and $R_3$ are each independently hydrocarbylene having 2, 3, or 4 carbon atoms (e.g., ethylene, propylene or isopropylene), the sum of each x and y group is an average value ranging from about 2 to about 60, and $R_4$ and $R_5$ are each independently hydrogen or a linear or branched chain hydrocarbyl or substituted hydrocarbyl having from 1 to about 6 carbon atoms.

Each $R_1$ is preferably independently an alkyl having from about 4 to about 22 carbon atoms, more preferably from about 8 to about 18 carbon atoms, and still more preferably from about 12 to about 18 carbons atoms, for example coco or tallow. $R_1$ is most preferably tallow. Each $R_2$ and $R_3$ is preferably ethylene. The sum of each x and y group is preferably independently an average value ranging from about 2 to about 22, more preferably between about 10 and about 20, for example, about 15. More preferably $R_4$ and $R_5$ are each independently hydrogen or a linear or branched chain alkyl having from 1 to about 6 carbon atoms. $R_4$ and $R_5$ are preferably hydrogen.

Specific phosphate esters of alkoxylated tertiary amine co-surfactants for use in the herbicidal composition of the present invention are described in U.S. 2002/0160918, by Lewis et al. (Huntsman Petrochemical Corporation), such as phosphate esters of tallow amine ethoxylates, including phosphate esters of SURFONIC® T5, phosphate esters of SURFONIC® T15, phosphate esters of SURFONIC® T20, and mixtures thereof, all available from Huntsman International LLC.

Phosphate esters of alkoxylated etheramine co-surfactants for use in the herbicidal compositions of the present invention have the general structures (Xa) and (Xb):

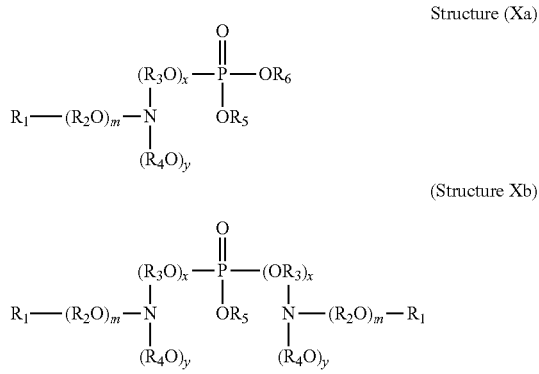

wherein each $R_1$ is independently a hydrocarbyl or substituted hydrocarbyl having from about 4 to about 22 carbon atoms; each $R_2$, $R_3$ and $R_4$ is independently a hydrocarbylene having 2, 3, or 4 carbon atoms (e.g., ethylene, propylene or isopropylene); each m is independently an average number from about 1 to about 10; the sum of each x and y group is independently an average value ranging from about 2 to about 60; and each $R_5$ and $R_6$ are independently hydrogen or a linear or branched chain alkyl having from 1 to about 6 carbon atoms.

Each $R_1$ is preferably independently an alkyl having from about 4 to about 22 carbon atoms, more preferably from about 8 to about 18 carbon atoms, from about 10 to about 16 carbon atoms, from about 12 to about 18 carbons atoms, or from about 12 to about 14 carbon atoms. Sources of the $R_1$ group include, for example, coco or tallow, or $R_1$ may be derived from synthetic hydrocarbyls, such as decyl, dodecyl, tridecyl, tetradecyl, hexadecyl, or octadecyl groups. Each $R_2$ may independently be propylene, isopropylene, or ethylene, and each m is preferably independently from about 1 to 5, such as 2 to 3. Each $R_3$ and $R_4$ may independently be ethylene, propylene, isopropylene, and are preferably ethylene. The sum of each x and y group is preferably independently an average value ranging from about 2 to about 22, such as from about 2 to 10, or about 2 to 5. In some embodiments, the sum of each x and y group is preferably independently between about 10 and about 20, for example, about 15. More preferably $R_5$ and $R_6$ are each independently hydrogen or a linear or branched chain alkyl having from 1 to about 6 carbon atoms. $R_5$ and $R_6$ are preferably hydrogen.

Phosphate esters of alkoxylated alcohol co-surfactants for use in the herbicidal compositions of the present invention have the general structures (XIa) and (XIb):

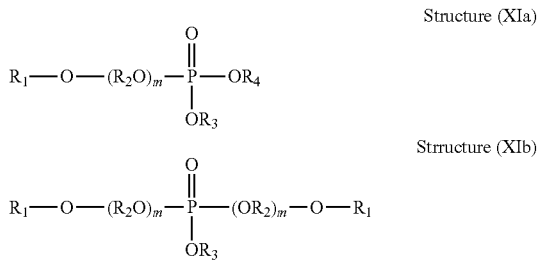

wherein each $R_1$ is independently a hydrocarbyl or substituted hydrocarbyl having from about 4 to about 22 carbon atoms; each $R_2$ is independently a hydrocarbylene having 2, 3, or 4 carbon atoms (e.g., ethylene, propylene or isopropylene); each m is independently an average number from about 1 to about 60; and $R_3$ and $R_4$ are each independently hydrogen or a linear or branched chain alkyl having from 1 to about 6 carbon atoms.

Each $R_1$ is preferably independently an alkyl having from about 4 to about 22 carbon atoms, more preferably from about 8 to about 20 carbon atoms, or an alkylphenyl having from about 4 to about 22 carbon atoms, more preferably from about 8 to about 20 carbon atoms. Sources of the $R_1$ group include, for example, coco or tallow, or $R_1$ may be derived from synthetic hydrocarbyls, such as decyl, dodecyl, tridecyl, tetradecyl, hexadecyl, or octadecyl groups. Each $R_2$ may independently be propylene, isopropylene, or ethylene, and is preferably ethylene. Each m is preferably independently from about 9 to about 15. More preferably $R_3$ and $R_4$ are each independently hydrogen or a linear or branched chain alkyl having from 1 to about 6 carbon atoms. $R_4$ and $R_5$ are preferably hydrogen.

Specific phosphate esters of alkoxylated alcohol co-surfactants for use in the herbicidal composition of the present invention include, for example, EMPHOS CS-121, EMPHOS PS-400, and WITCONATE D-51-29, available from Akzo Nobel.

In aqueous concentrate and RTU compositions of the present invention, a concentration ratio of the glyphosate in grams acid equivalent ("g a.e./L") to the surfactant component in g/L of from about 1:1 to about 50:1 is preferred, more preferably from about 2:1 to about 20:1, more preferably from about 2:1 to about 10:1, more preferably from about 3:1 to about 10:1, and most preferably from about 3:1 to about 5:1, such as about 4:1. In aqueous concentrates of the present invention, total surfactant loadings of about 120 g/L to about 150 g/L, such as about 135 g/L, can be attained in compositions containing glyphosate salt loadings of about 480 g a.e./L to about 600 g a.e./L, such as about 540 g/L. The weight ratio of glyphosate to surfactant component is important from the standpoints of enhanced bioefficacy, compatibility, and long term storage stability.

In solid concentrate compositions of the present invention, a weight ratio of glyphosate in grams acid equivalent ("g a.e.") to the total surfactant component in grams may generally vary from about 1:1 to about 50:1, preferably from about 2:1 to about 20:1, more preferably from about 2:1 to about 10:1, more preferably from about 3:1 to about 10:1, and most preferably from about 3:1 to about 5:1, such as about 4:1.

With regard to the surfactant blend, a concentration ratio of the amidoalkylamine surfactant in g/L to any of above-described additional surfactants, alone or in combination with other surfactants, in g/L may vary from 10:1 to about 1:10, more preferably from 8:1 to about 1:8, more preferably from 5:1 to about 1:5, and most preferably from 2:1 to about 1:2. Preferably, the concentration ratio of the amidoalkylamine surfactant in g/L to any of above-described additional surfactants, alone or in combination with other surfactants in g/L is less than about 45:55, more preferably less than about 40:60, even more preferably less than about 35:65.

Suitable foam-moderating agents include silicone-based compositions. An example of a foam-moderating agent for compositions is SAG-10, available from GE Silicones Corporation (Wilton, Conn.). The amount of foam-moderating agent optionally employed is that which is sufficient to inhibit and/or reduce an amount of foam that may otherwise be formed during the process of preparing and containerizing the formulation and/or use thereof to a desired and satisfactory level. Generally, the concentration of foam-moderating agent is in the range from about 0.001% up to about 0.05% by weight of the composition, and typically from about 0.01% to about 0.03% by weight of the composition, although greater or lesser amounts may be employed.

The compositions may also comprise a preservative such as PROXEL GXL containing 1,2-benzisothiazolin-3-one (CAS No. 2634-33-5) available from Avecia, Inc. (Wilmington, Del.), DOWICIL 150 containing cis-1-(3-chloroallyl)-3,5,7-triaza-1-azoniaadmatane chloride (CAS No. 051229-78-8) available from Dow Chemical Company (Midland, Mich.), NIPACIDE BIT20DPG containing benzisothiazolinone available from Clariant Corporation (Greensboro, N.C.), LEGEND MK anti-microbial biocide available from Rohm and Haas Co. (Philadelphia, Pa.), sorbic acid, mixtures thereof and the like in the range of from about 0.01% to about 0.2% by weight, preferably about 0.1% by weight of the composition.

Suitable antifreeze agents include ethylene glycol and propylene glycol and generally may be present at a concentration of from about 0.1% to about 10% by weight of the RTU composition. Antifreeze agents assist in lowering the freezing point of aqueous solutions and maintaining solubility of the components of the composition such that components do not crystallize or precipitate during cycles of freezing and thawing.

Although the compositions of the present invention generally show good overall stability and viscosity properties without the addition of any further additives, the addition of a solubility-enhancing agent (also commonly referred to as a cloud point enhancer or stabilizer) may significantly improve the properties of the formulations. Solubility-enhancing agents include polymer derivatives of ethylene glycol and propylene glycol (e.g., 200-1200 average molecular weight), glycerol, sugars, mixtures thereof and the like in amounts up to about 10%, preferably from about 0.05 to about 10% by weight, more preferably from about 0.1 to about 1% by weight of the RTU composition.

The herbicidal compositions, i.e., liquid concentrates, solid concentrates, and ready to use formulations may further comprise a co-herbicide. The amidoalkylamine surfactant enhances the solubility of tank-mixed herbicidal compositions that further comprise a co-herbicide. In some preferred embodiments, the herbicidal composition is a tank mixed ready to use formulation further comprising a co-herbicide, said tank mixed ready to use formulation being more stable, i.e., characterized by reduced agglomeration or precipitation of the co-herbicide, than conventional glyphosate formulations.

In some embodiments, water-soluble co-herbicides can be included in the compositions of the present invention. Water-soluble co-herbicides include acifluorfen, acrolein, amitrole, asulam, benazolin, bentazon, bialaphos, bromacil, bromoxynil, chloramben, chloroacetic acid, clopyralid, 2,4-D, 2,4-DB, dalapon, dicamba, dichlorprop, difenzoquat, diquat, endothall, fenac, fenoxaprop, flamprop, flumiclorac, fluoroglycofen, flupropanate, fomesafen, fosamine, glufosinate, imazameth, imazamethabenz, imazamox, imazapic, imazapyr, imazaquin, imazethapyr, ioxynil, MCPA, MCPB, mecoprop, methylarsonic acid, naptalam, nonanoic acid, paraquat, picloram, quinclorac, sulfamic acid, 2,3,6-TBA, TCA, triclopyr and water-soluble salts thereof.

In some embodiments, co-herbicides that are not readily water-soluble can be coupled into the aqueous herbicidal composition by inclusion of a sufficient quantity of an appropriate surfactant. In addition, the compositions of the present invention may include finely-divided, water-insoluble herbicides. Examples of herbicides having limited water solubility include, for example, acetochlor, aclonifen, alachlor, ametryn, amidosulfuron, anilofos, atrazine, azafenidin, azimsulfuron, benfluralin, benfuresate, bensulfuron-methyl, bensulide, benzofenap, bifenox, bromobutide, bromofenoxim, butachlor, butamifos, butralin, butroxydim, butylate, cafenstrole, carbetamide, carfentrazone-ethyl, chlomethoxyfen, chlorbromuron, chloridazon, chlorimuron-ethyl, chlornitrofen, chlorotoluron, chlorpropham, chlorsulfuron, chlorthal-dimethyl, chlorthiamid, cinmethylin, cinosulfuron, clethodim, clodinafop-propargyl, clomazone, clomeprop, cloransulam-methyl, cyanazine, cycloate, cyclosulfamuron, cycloxydim, cyhalofop-butyl, daimuron, desmedipham, desmetryn, dichlobenil, diclofop-methyl, diflufenican, dimefuron, dimepiperate, dimethachlor, dimethametryn, dimethenamid, dinitramine, dinoterb, diphenamid, dithiopyr, diuron, EPIC, esprocarb, ethalfluralin, ethametsulfuron-methyl, ethofumesate, ethoxysulfuron, etobenzanid, fenoxaprop-ethyl, fenuron, flamprop-methyl, flazasulfuron, fluazifop-butyl, fluchloralin, flumetsulam, flumiclorac-pentyl, flumioxazin, fluometuron, fluorochloridone, fluoroglycofen-ethyl, flupoxam, flurenol, fluridone, fluroxypyr-1-methylheptyl, flurtamone, fluthiacet-methyl, fomesafen, halosulfuron, haloxyfop-methyl, hexazinone, imazamox, imazosulfuron, indanofan, isoproturon, isouron, isoxaben, isoxaflutole, isoxapyrifop, lactofen, lenacil, linuron, mefenacet, mesotrione, metamitron, metazachlor, methabenzthiazuron, methyldymron, metobenzuron, metobromuron, metolachlor, metosulam, metoxuron, metribuzin, metsulfuron, molinate, monolinuron, naproanilide, napropamide, naptalam, neburon, nicosulfuron, norflurazon, orbencarb, oryzalin, oxadiargyl, oxadiazon, oxasulfuron, oxyfluorfen, pebulate, pendimethalin, pentanochlor, pentoxazone, phenmedipham, piperophos, pretilachlor, primisulfuron, prodiamine, prometon, prometryn, propachlor, propanil, propaquizafop, propazine, propham, propisochlor, propyzamide, prosulfocarb, prosulfuron, pyraflufen-ethyl, pyrazolynate, pyrazosulfuron-ethyl, pyrazoxyfen, pyributicarb, pyridate, pyriminobac-methyl, quinclorac, quinmerac, quizalofop-ethyl, rimsulfuron, sethoxydim, siduron, simazine, simetryn, sulcotrione, sulfentrazone, sulfometuron, sulfosulfuron, tebutam, tebuthiuron, terbacil, terbumeton, terbuthylazine, terbutryn, thenylchlor, thiazopyr, thifensulfuron, thiobencarb, tiocarbazil, tralkoxydim, triallate, triasulfuron, tribenuron, trietazine, trifluralin, triflusulfuron, and vernolate. Additional herbicidal active ingredient(s) in a concentrate or RTU formulation are present in an agriculturally useful concentration that will vary depending on the particular additional herbicide(s) selected for inclusion and is readily determined-by those skilled in the art.

The herbicidal concentrate of the present invention may be prepared by combining the required amounts of glyphosate, water, amidoalkylamine surfactant coupling agent, and the co-surfactant, with mixing using a mechanical stirrer or any other suitable container or device producing the necessary amount of agitation or circulation to thoroughly mix the ingredients. The order of addition of the starting materials is not narrowly critical to the stability of the final concentrate. In various embodiments, the herbicidal concentrate is prepared according to an order of component addition. Herein, water is preferably added to the mixing vessel first, followed by the addition of the glyphosate salt. Next, the amidoalkylamine surfactant coupling agent is added, followed by the addition of the co-surfactant. In some embodiments, the co-surfactant may be added as a preblended mixture with the amidoalkylamine surfactant. In other embodiments, the co-surfactants may be added singly, either before or after addition of the amidoalkylamine surfactant.

A solid concentrate of the present invention may also be prepared by combining the required amounts of glyphosate, amidoalkylamine surfactant coupling agent, the co-surfactant, with mixing using a mechanical stirrer, ball milling, or any other suitable container or device producing the necessary amount of agitation or circulation to thoroughly mix the ingredients. The order of addition of the materials to prepare the solid concentrate is not narrowly critical to the stability of the final concentrate.

The RTU compositions of the present invention can be prepared by diluting an aqueous herbicidal concentrate or dissolving a solid concentrate with an appropriate amount of water.

The present invention is also directed to a method for killing or controlling weeds or other unwanted plants by spraying or otherwise applying a herbicidally effective amount of the RTU or diluted concentrate formulations described herein to the foliage of the plants to be treated. The herbicidal spray compositions included in the present invention can be applied to the foliage of the plants to be treated through any of the appropriate methods that are well known to those having skill in the art. In some embodiments, the RTU composition is packaged in a portable container suitable for hand carry by the user and fitted with an apparatus for manually releasing the composition from the container onto the foliage of the plants to be treated in the form of a spray.

The compositions of the present invention can be used to kill or control the growth of a wide variety of plants. Particularly important annual dicotyledonous plant species include, without limitation, velvetleaf (*Abutilon theophrasti*), pigweed (*Amaranthus* spp.), buttonweed (*Borreria* spp.), oilseed rape, canola, indian mustard, etc. (*Brassica* spp.), *commelina* (*Commelina* spp.), filaree (*Erodium* spp.), sunflower (*Helianthus* spp.), morningglory (*Ipomoea* spp.), kochia (*Kochia scoparia*), mallow (*Malva* spp.), wild buckwheat, smartweed, etc. (*Polygonum* spp.), purslane (*Portulaca* spp.), Russian thistle (*Salsola* spp.), sida (*Sida* spp.), wild mustard (*Sinapis arvensis*) and cocklebur (*Xanthium* spp.).

Particularly important annual monocotyledonous plant species that may be killed or controlled using the compositions of the present invention include, without limitation, wild oat (*Avena fatua*), carpetgrass (*Axonopus* spp.), downy brome (*Bromus tectorum*), crabgrass (*Digitaria* spp.), barnyardgrass (*Echinochloa crus-galli*), goosegrass (*Eleusine indica*), annual ryegrass (*Lolium multiflorum*), rice (*Oryza sativa*), ottochloa (*Ottochloa nodosa*), bahiagrass (*Paspalum notatum*), canarygrass (*Phalaris* spp.), foxtail (*Setaria* spp.), wheat (*Triticum aestivum*) and corn (*Zea mays*).

Particularly important perennial dicotyledonous plant species for control of which a composition of the invention can be used include, without limitation, mugwort (*Artemisia* spp.), milkweed (*Asclepias* spp.), Canada thistle (*Cirsium arvense*), field bindweed (*Convolvulus arvensis*) and kudzu (*Pueraria* spp.).

Particularly important perennial monocotyledonous plant species for control of which a composition of the invention can be used include, without limitation, brachiaria (*Brachiaria* spp.), bermudagrass (*Cynodon dactylon*), quackgrass (*Elymus repens*), lalang (*Imperata cylindrica*), perennial ryegrass (*Lolium perenne*), guineagrass (*Panicum maximum*), dallisgrass (*Paspalum dilatatum*), reed (*Phragmites* spp.), johnsongrass (*Sorghum halepense*) and cattail (*Typha* spp.).

Other particularly important perennial plant species for control of which a composition of the invention can be used include, without limitation, horsetail (*Equisetum* spp.), bracken (*Pteridium aquilinum*), blackberry (*Rubus* spp.) and gorse (*Ulex europaeus*).

Suitable herbicidally efficacious application or spray rates used in the practice of the present invention will vary depending on the particular composition and concentration of active ingredients, the desired effects, plant species treated, weather and other factors. What constitutes a "desired effect" varies according to the standards and practice of those who investigate, develop, market and use compositions and the selection of application rates that are herbicidally effective for a composition of the invention is within the skill of those skilled in the art.

Definitions

The term "hydrocarbyl" as used herein describes organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 30 carbon atoms.

The term "hydrocarbylene" as used herein describes radicals joined at two ends thereof to other radicals in an organic compound, and which consist exclusively of the elements carbon and hydrogen. These moieties include alkylene, alkenylene, alkynylene, and arylene moieties. These moieties also include alkyl, alkenyl, alkynyl, and aryl moieties substituted with other aliphatic or cyclic hydrocarbon groups, such as alkaryl, alkenaryl and alkynaryl.

Unless otherwise indicated, these moieties preferably comprise 1 to 30 carbon atoms.

The term "substituted hydrocarbyl" as used herein describes hydrocarbyl moieties that are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, ketal, acyl, acyloxy, nitro, amino, amido, cyano, thiol, acetal, sulfoxide, ester, thioester, ether, thioether, hydroxyalkyl, urea, guanidine, amidine, phosphate, amine oxide, and quaternary ammonium salt.

The "substituted hydrocarbylene" moieties described herein are hydrocarbylene moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, ketal, acyl, acyloxy, nitro, amino, amido, cyano, thiol, acetal, sulfoxide, ester, thioester, ether, thioether, hydroxyalkyl, urea, guanidine, amidine, phosphate, amine oxide, and quaternary ammonium salt.

Unless otherwise indicated, the alkyl groups described herein are preferably lower alkyl containing from one to 18 carbon atoms in the principal chain and up to 30 carbon atoms. They may be straight or branched chain or cyclic and include methyl, ethyl, propyl, isopropyl, n-butyl, isobutyl, hexyl, 2-ethylhexyl, and the like.

Unless otherwise indicated, the alkenyl groups described herein are preferably lower alkenyl containing from two to 18 carbon atoms in the principal chain and up to 30 carbon atoms. They may be straight or branched chain or cyclic and include ethenyl, propenyl, isopropenyl, butenyl, isobutenyl, hexenyl, and the like. Unless otherwise indicated, the alkynyl groups described herein are preferably lower alkynyl containing from two to 18 carbon atoms in the principal chain and up to 30 carbon atoms. They may be straight or branched chain and include ethynyl, propynyl, butynyl, isobutynyl, hexynyl, and the like. The term "aryl" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The term "aralkyl" as used herein denotes a group containing both alkyl and aryl structures such as benzyl.

As used herein, the alkyl, alkenyl, alkynyl, aryl and aralkyl groups can be substituted with at least one atom other than carbon, including moieties in which a carbon chain atom is substituted with a hetero atom such as nitrogen, oxygen, silicon, phosphorous, boron, sulfur, or a halogen atom. These substituents include hydroxy, nitro, amino, amido, nitro, cyano, sulfoxide, thiol, thioester, thioether, ester and ether, or any other substituent which can increase the compatibility of the surfactant and/or its efficacy enhancement in the potassium glyphosate formulation without adversely affecting the storage stability of the formulation.

The terms "halogen" or "halo" as used herein alone or as part of another group refer to chlorine, bromine, fluorine, and iodine. Fluorine substituents are often preferred in surfactant compounds.

Unless otherwise indicated, the term "hydroxyalkyl" includes alkyl groups substituted with at least one hydroxy group, e.g., bis(hydroxyalkyl)alkyl, tris(hydroxyalkyl)alkyl and poly(hydroxyalkyl)alkyl groups. Preferred hydroxyalkyl groups include hydroxymethyl ($—CH_2OH$), and hydroxyethyl ($—C_2H_4OH$), bis(hydroxy-methyl)methyl ($—CH(CH_2OH)_2$), and tris(hydroxymethyl)methyl ($—C(CH_2OH)_3$).

The term "cyclic" as used herein alone or as part of another group denotes a group having at least one closed ring, and includes alicyclic, aromatic (arene) and heterocyclic groups.

The terms "heterocyclo" or "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include heteroaromatics such as furyl, thienyl, pyridyl, oxazolyl, pyrrolyl, indolyl, quinolinyl, or isoquinolinyl and the like, and non-aromatic heterocyclics such as tetrahydrofuryl, tetrahydrothienyl, piperidinyl, pyrrolidino, etc. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, thioester, thioether, ketal, acetal, ester and ether.

The term "heteroaromatic" as used herein alone or as part of another group denote optionally substituted aromatic groups having at least one heteroatom in at least one ring, and preferably 5 or 6 atoms in each ring. The heteroaromatic group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heteroaromatics include furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, thioether, thioester, ketal, acetal, ester and ether.

The term "acyl," as used herein alone or as part of another group, denotes the moiety formed by removal of the hydroxyl group from the group —COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo and $R^2$ is hydrogen, hydrocarbyl or substituted hydrocarbyl.

The term "acyloxy," as used herein alone or as part of another group, denotes an acyl group as described above bonded through an oxygen linkage (—O—), e.g., RC(O)O— wherein R is as defined in connection with the term "acyl."

When a maximum or minimum "average number" is recited herein with reference to a structural feature such as oxyethylene units, it will be understood by those skilled in the art that the integer number of such units in individual molecules in a surfactant preparation typically varies over a range that can include integer numbers greater than the maximum or smaller than the minimum "average number". The presence in a composition of individual surfactant molecules having an integer number of such units outside the stated range in "average number" does not remove the composition from the scope of the present invention, so long as the "average number" is within the stated range and other requirements are met.

Herbicidal effectiveness is one of the biological effects that can be enhanced through this invention. "Herbicidal effectiveness," as used herein, refers to any observable measure of control of plant growth, which can include one or more of the actions of (1) killing, (2) inhibiting growth, reproduction or proliferation, and (3) removing, destroying, or otherwise diminishing the occurrence and activity of plants.

Having described the invention in detail, it will be apparent that modifications and variations are possible without departing from the scope of the invention defined in the appended claims.

EXAMPLES

The following non-limiting examples are provided to further illustrate the present invention.

Experimental Methods

The following describes the method of preparing the formulations and experimental methods used to test the formulations in Examples 1 through 4.

Formulation Preparation

In the following examples, glyphosate formulations were prepared containing water, glyphosate salt, and surfactant (either single surfactants or surfactant blends) according to the following order of addition:

(1) appropriate amount (g) of DI Water
(2) appropriate amount (g) of glyphosate salt solution
(3) appropriate amount (g) of amidoalkylamine surfactant
(4) appropriate amount (g) of co-surfactant/co-surfactant blend.

The components were added to 4 or 8 oz (118 mL or 236 mL) glass jars, and the formulations were stirred using magnetic stir bars at room temperature until clear. If the formulation did not clear after 24 hours of mixing, it was described as unstable.

Formulations that were stable at room temperature for at least 2 hours were held at −10° C. and 60° C. for four weeks for storage stability testing. Changes in color, crystallization, and phase separation were evaluated by a visual rating each week after the test began.

Formulations were tested for cloud point using the following procedure. Test formulation is poured into a 25 mm×200 mm Pyrex test tube to a level of approximately 2 inches from the bottom. The test sample is heated until cloudy using a hot water bath. Temperature is monitored using an alcohol thermometer. Once the previously clear formulation becomes cloudy, or the temperature reaches 80° C., the test sample is removed from the water bath. If the formulation is clear throughout the test, the cloud point is recorded as >80° C. If cloudy, the formulation is stirred with the alcohol thermometer until clear. The temperature at which the test sample clears is recorded as the formulation cloud point.

Efficacy Testing

The herbicidal effectiveness data set forth herein report "control" as a percentage following a standard procedure in the art which reflects a visual assessment of plant mortality and growth reduction by comparison with untreated plants, made by technicians specially trained to make and record such observations. In all cases, a single technician makes all assessments of percent control within any one experiment or trial. Such measurements are relied upon and regularly reported by Monsanto Company in the course of its herbicide business.

The following procedure was used for testing compositions of the Examples to determine herbicidal effectiveness, except where otherwise indicated.

Seeds of the plant species indicated were planted in 85 mm square pots in a soil mix which was previously steam sterilized and prefertilized with a 14-14-14 NPK slow release fertilizer at a rate of 3.6 kg/m$^3$. The pots were placed in a greenhouse with sub-irrigation. About one week after emergence, seedlings were thinned as needed, including removal of any unhealthy or abnormal plants, to create a uniform series of test pots.

The plants were maintained for the duration of the test in the greenhouse where they received a minimum of 14 hours of light per day. If natural light was insufficient to achieve the daily requirement, artificial light with an intensity of approximately 475 microeinsteins was used to make up the difference. Exposure temperatures were not precisely controlled but averaged about 27° C. during the day and about 21° C. during the night. Plants were sub-irrigated throughout the test to ensure adequate soil moisture levels.

Application of glyphosate compositions was made by spraying with a track sprayer fitted with a 9501E nozzle calibrated to deliver a spray volume of 93 liters per hectare (l/ha) at a pressure of 166 kilopascals (kPa). After treatment, pots were returned to the greenhouse until ready for evaluation.

Treatments were made using dilute aqueous compositions. These could be prepared as spray compositions directly from their ingredients, or by dilution with water of preformulated concentrate compositions.

For evaluation of herbicidal effectiveness, all plants in the test were examined by a single practiced technician, who recorded percent control, a visual measurement of the effectiveness of each treatment by comparison with untreated plants. Control of 0% indicates no effect, and control of 100% indicates that all of the plants are completely dead. Control of 85% or more is in most cases considered acceptable for normal herbicide use; however in greenhouse tests such as those for the Examples it is normal to apply compositions at rates which give less than 85% control, as this makes it easier to discriminate among compositions having different levels of effectiveness.

Example 1. Formulation Viscosity

The viscosities of various diammonium glyphosate salt formulations were determined as a function of surfactant type and surfactant concentration. Viscosity with respect to temperature was measured using TA Instruments, AR 2000 Rheometer. Five glyphosate formulations containing various loadings of $C_{8-10}$ amidopropyl dimethylamine, Adsee C80W (cocoamidopropyl dimethylamine), and a blend of surfactants (Ethoquad C/12 and an alkoxylated fatty alcohol) available in a commercial glyphosate formulation (labeled "blend" in Table 1 and FIG. 1) were studied using a step-flow procedure where temperature was ramped up from 0° C. to 10° C. and then to 20° C. Comparisons were made at the 20° C. measurement. No viscosity increase was observed in any 360 g a.e./L or 369 g a.e./L formulation regardless of surfactant type. Higher loading glyphosate formulations (480 g a.e./L) were also prepared having the components shown in Table 1:

TABLE 1

| Glyphosate salt | Glyphosate concentration (g a.e./L) | Surfactant | Surfactant concentration (g/L) |
|---|---|---|---|
| 2 (NH$_4$) | 480 | Blend | 83 |
| 2 (NH$_4$) | 480 | C$_{8-10}$ amidopropyl dimethylamine | 58 |
| 2 (NH$_4$) | 480 | C$_{8-10}$ amidopropyl dimethylamine | 120 |
| 2 (NH$_4$) | 480 | Adsee C80W | 58 |
| 2 (NH$_4$) | 480 | Adsee C80W | 66 |

FIG. 1 is a graph depicting the viscosities of the various diammonium glyphosate salt formulations as a function of surfactant type and surfactant loading.

The high load glyphosate formulations containing Adsee C80W were characterized by noticeably higher viscosity than the other formulations. To lower the viscosity of the high load formulation, the total surfactant level was lowered to 58 g/L, such that the glyphosate to surfactant ratio was 8.3:1. It is believed that the high viscosity of the Adsee formulations resulted from the relatively basic pH of the formulation. Lowering the viscosity of the high glyphosate load formulations employing Adsee C80W was accomplished in another manner by lowering the composition pH.

Formulations containing the C$_{8-10}$ amidopropyl dimethylamine surfactant (C8,10 APA in FIG. 1) were characterized by relatively low viscosity even at a glyphosate to surfactant ratio of 4:1 even at alkaline pH. It was discovered that low viscosities were achieved over a broad pH range for high glyphosate load formulations employing the C$_{8-10}$ amidopropyl dimethylamine surfactant.

Figure 2:
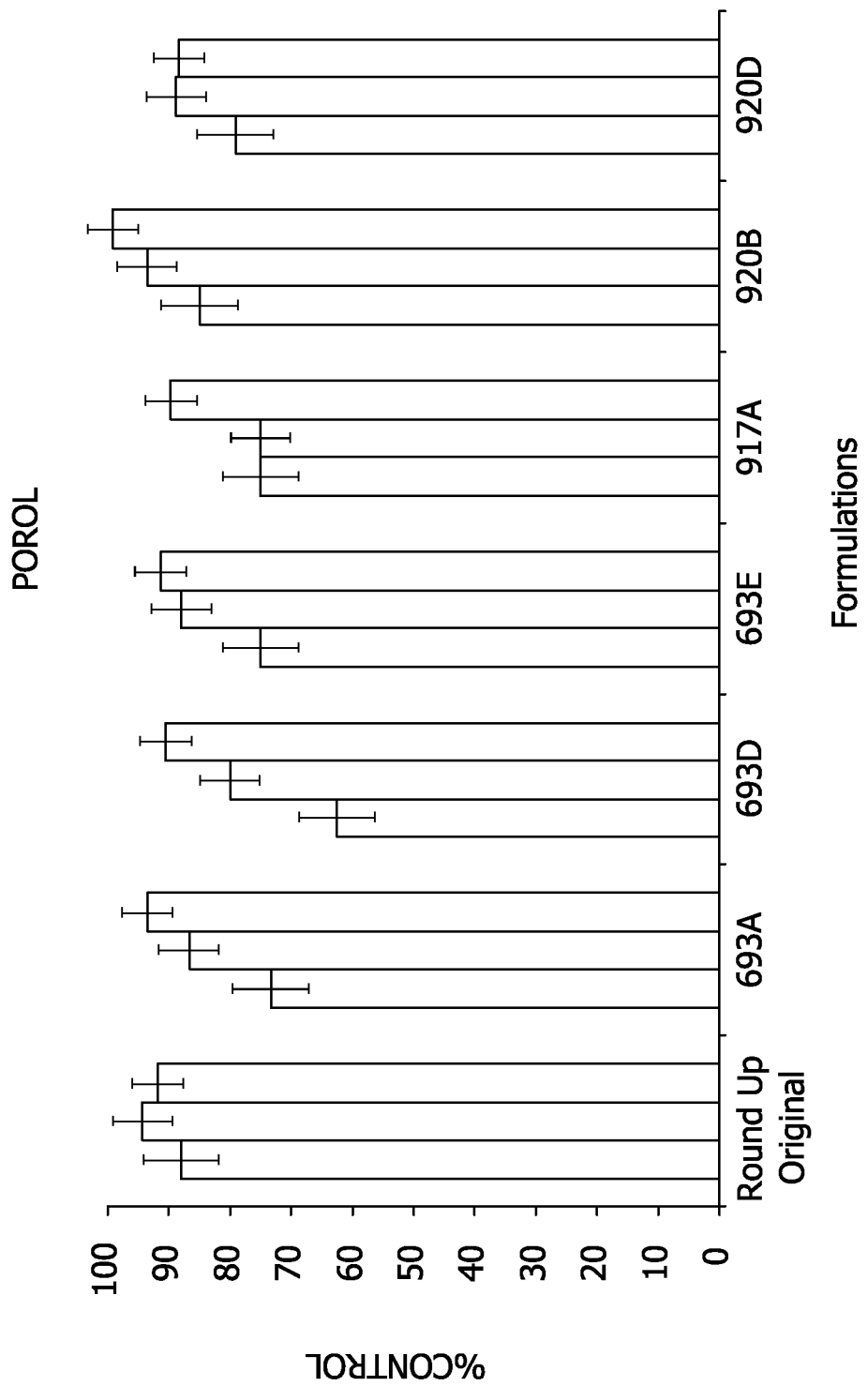
FIG. 2 is a graph of bioefficacy data from a greenhouse study. The test formulations included Adsee C80W surfactant. The data were obtained according to the method described in Example 2.

Example 2. Greenhouse Bioefficacy Data of Glyphosate Formulations Containing Adsee C80W Glyphosate formulations containing Adsee C80W were prepared and tested for bioefficacy. The bioefficacy of the formulations containing Adsee C80W were compared to RoundUp® Original and two formulations containing blends of Ethoquad surfactants (available from Akzo Nobel). Bioefficacy evaluations were done on common purslane (POROL) at application rates of 280 g a.e., 560 g a.e., and 841 g a.e. per hectare of glyphosate, respectively, as shown from left to right for each formulation in FIG. 2.

In each formulation, the source of glyphosate was diammonium glyphosate salt. In two formulations, ethoxylated quaternary amines were blended with Adsee C80W to improve bioefficacy. In another formulation, Adsee C80W was coupled with the alkypolyglucoside surfactant 2-ethyl-1-hexylglycoside (Akzo Nobel). In still another formulation, Adsee C80W was used as the only surfactant. The compositions of each formulation are outlined in Table 2. In Table 2, 2E1H-glycoside refers to 2-ethyl-1-hexylglycoside, CIS refers to cationic surfactant and NIS refers to nonionic surfactant. Greenhouse data is summarized in FIG. 2 wherein the first column for each formulation represents % POROL control at an application rate of 280 g a.e./ha glyphosate, the second column for each formulation represents % POROL control at an application rate of 560 g a.e./ha glyphosate and the third column for each formulation represents % POROL control at an application rate of 841 g a.e./ha glyphosate.

The glyphosate formulations 693A, 693D, 693E, and 917A described in Table 2 are diammonium glyphosate salt formulations containing Adsee C80W alone and blended with a co-surfactant. Also included in this study were two formulations, 920B and 920D, containing blends of Ethoquad T/18 and Ethoquad C/12. All glyphosate formulations were compared to commercial standard Roundup® Original (as sold in Brazil). All samples containing Adsee C80W were significantly less efficacious than Roundup® Original. The samples containing Adsee C80W were the least efficacious samples in this study. Comparison of formulations 693A and 693E, which contain Adsee C80W formulated with ethoxylated quaternary amines, to formulation 917A which contains Adsee C80W alone, indicates that the ethoxylated quaternary amines do not provide improved bioefficacy on POROL when formulated with Adsee C80W.

TABLE 2

Diammonium Glyphosate Formulations Containing Adsee C80W

| Form. | Active amount, % a.e. by mass | Active amount, g a.e./L | Surfactant 1 | Amount of surfactant 1 (%) | Surfactant 2 | Amount of surfactant 2 (%) |
|---|---|---|---|---|---|---|
| 693A | 38.4 | 480 | Adsee C80W | 5.39 | Ethoquad C/12 | 2.31 |
| 693D | 38.4 | 480 | Adsee C80W | 5.39 | 2E1H-glycoside | 2.31 |
| 693E | 38.4 | 480 | Adsee C80W | 5.39 | Ethoquad C/15 | 2.31 |
| 917A | 30.2 | 360 | Adsee C80W | 7.63 | — | — |
| 920B | 30.2 | 360 | Ethoquad T/18 | 5.18 | Ethoquad C/12 | 1.23 |
| 920D | 30.2 | 360 | Ethoquad T/18 | 4.95 | Ethoquad C/12 | 0.95 |

Example 3. Greenhouse Bioefficacy Data of Glyphosate Formulations Containing C$_{8-10}$ Amidopropyl Dimethylamine High load glyphosate formulations containing C$_{8-10}$ amidopropyl dimethylamine surfactant were prepared and tested for bioefficacy. The efficacies of formulations containing C$_{8-10}$ amidopropyl dimethylamine surfactant were compared against commercially available glyphosate formulations, two standard formulations, and two additional test formulations containing blends of quaternary amine surfactants. In each formulation, the source of glyphosate was diammonium glyphosate salt. Formulation details are summarized in Table 3.

Formulations 163A, 163B, and 163C contained a blend of C$_{8-10}$ amidopropyl dimethylamine ("C$_{8-10}$ APA" in Table 3) and a blend of quaternary tallowamine ethoxylate (Ethoquad T/20) and quaternary cocoamine (Ethoquad C/12) in a weight ratio of 70:30. This is designated "blend" in Table 3. The ratio of C$_{8-10}$ amidopropyl dimethylamine and blend were varied in each of formulations 163A, 163B, and 163C.

The commercial product Fosato® (a commercial product marketed by Monsanto in Argentina) was also tested for bioefficacy. Fosato® contains diammonium glyphosate and surfactant in a ratio of g a.e./L glyphosate to g/L surfactant of 8.3:1. The formulations were also compared to Standard 1 (comprising 480 g a.e./L diammonium glyphosate with no surfactant) and Standard 2 (containing 480 g a.e./L diammonium glyphosate and a blend of ethoxylated quaternary amine and alkoxylated fatty alcohol. The glyphosate a.e. to surfactant ratio in the formulations tested was maintained at 8:1, approximately equal to Fosato®. Two additional formulations, 163D and 163E were included to investigate differences between Ethoquad C12 and $C_{8-10}$ amidopropyl dimethylamine.

Figure 3:
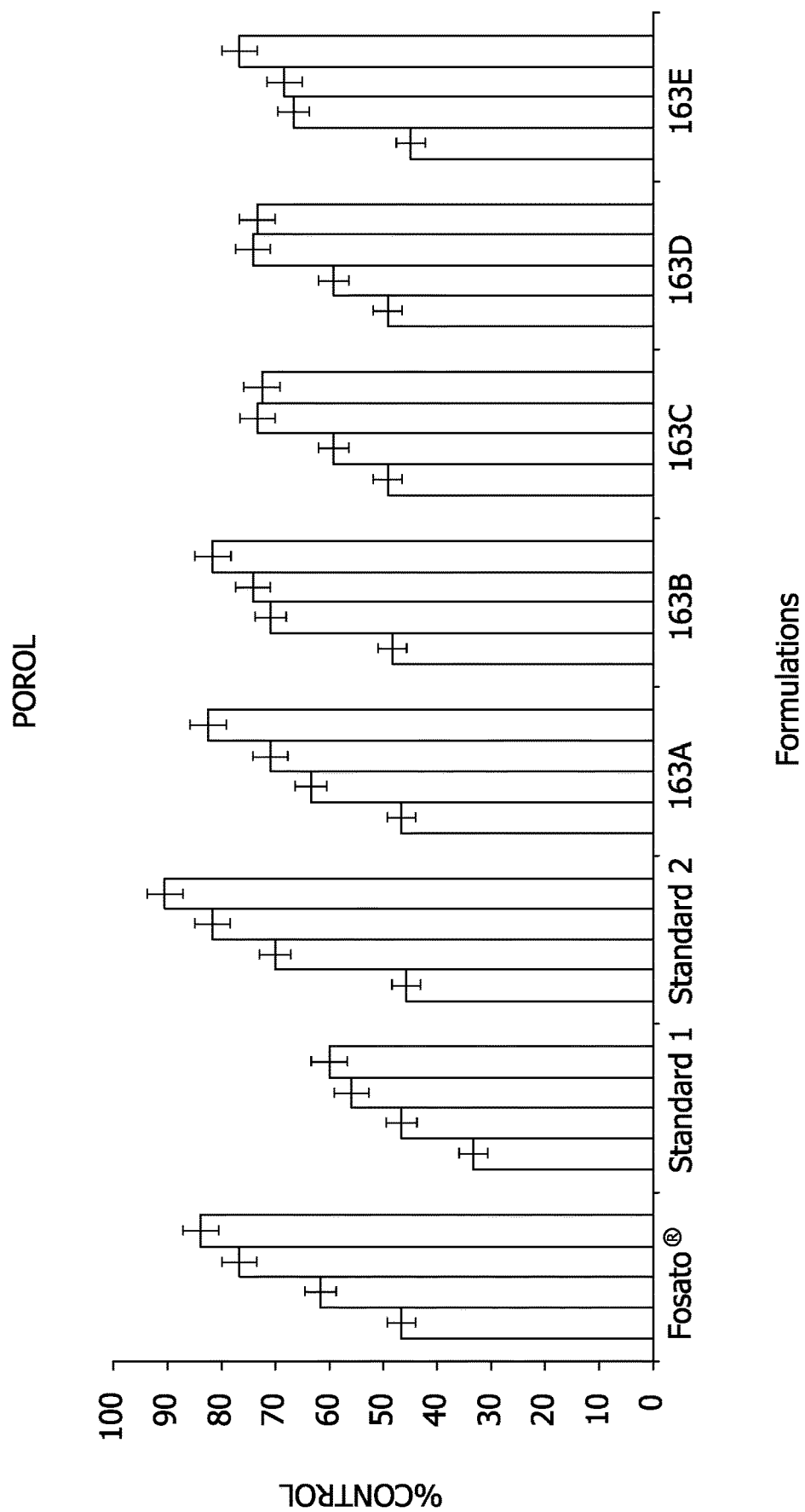
FIG. 3 is a graph of bioefficacy data from a greenhouse study. The test formulations included a $C_8$-$C_{10}$ amidopropyl dimethylamine surfactant. The data were obtained according to the method described in Example 3.

Evaluations were done on POROL at application rates of 426 g a.e., 628 g a.e., 841 g a.e., and 1120 g a.e. per hectare of glyphosate. The Greenhouse data are summarized in FIG. 3 wherein the first column for each formulation represents % POROL control at an application rate of 426 g a.e./ha glyphosate, the second column for each formulation represents % POROL control at an application rate of 628 g a.e./ha glyphosate, the third column for each formulation represents % POROL control at an application rate of 841 g a.e./ha glyphosate and the fourth column for each formulation represents % POROL control at an application rate of 1120 g a.e./ha glyphosate.

Based on the greenhouse study, the bioefficacy of the glyphosate formulations containing $C_{8-10}$ amidopropyl dimethylamine were statistically equal to Fosato® when applied to POROL. No statistical differences were seen when comparing the formulations containing $C_{8-10}$ amidopropyl dimethylamine to those containing Ethoquad C12. Standard 2 was the most efficacious formulation tested. Additional studies were focused on formulations containing higher surfactant loadings and tested against more efficacious formulations.

tallowamine surfactants designated 199A and 753A were prepared at pH 6.5. Diammonium glyphosate is typically formulated as the dibasic salt and as such contains approximately two mols of $NH_4$ per mol of glyphosate acid.

Formulations 199A and 753A were tested against commercially available Roundup® Transorb® (480 g a.e./L loadings of the potassium glyphosate salt in a ratio of glyphosate in g a.e./L to surfactant in g/L of 4:1) and a surfactant diluted version of Roundup® Transorb® (480 g a.e./L loadings of the potassium glyphosate salt in a ratio of glyphosate in g a.e./L to surfactant in g/L of 5:1) designated "Transorb® dilute" in Table 4.

Higher load potassium glyphosate formulations (540 g a.e./L) containing $C_{8-10}$ amidopropyl dimethylamine ("$C_{8-10}$ APA" in Table 4) blended with ethoxylated tertiary tallowamine surfactants designated 201B, 201C, and 201D were prepared at pH 4.5. Potassium glyphosate is typically formulated as the monobasic salt and as such contains 1 mol K per mol of Glyphosate acid.

Formulations 201B, 201C, and 201D were compared against a commercial product (designated "CS1" in Table 4 and in FIG. 4) containing 540 g a.e./l of glyphosate potassium salt, the formulation of which is described in U.S. Pat. No. 6,365,551.

Measurement of pH can be according to any suitable protocol. For example, a sample of a test formulation of known weight is diluted in demineralized water to make a total solution mass of, say 100 g, which is agitated, e.g., with a magnetic stir bar. A pH meter capable of measuring pH to two decimal places, and fitted with an electrode with temperature compensation, is calibrated with standard buffers, for example pH 4.0 and pH 7.0. The solution pH is recorded when a stable reading is obtained. Between sample measurements the electrode should be washed with and stored in demineralized water.

TABLE 3

Diammonium Glyphosate Formulations Containing $C_{8-10}$ Amidopropyl Dimethylamine

| | Active amount, % a.e. by mass | Active amount, g a.e./L | Surfactant 1 | Amount of surfactant 1 (%) | Surfactant 2 | Amount of surfactant 2 (%) | Glyphosate a.e.:Surfactant a.i. |
|---|---|---|---|---|---|---|---|
| Fosato ® | 30.7 | 369 | Ethoxylated quaternary amine | ND | Alkoxylated fatty alcohol | ND | 8.3:1 |
| Standard 1 | 42.1 | — | — | — | — | — | — |
| Standard 2 | 40.1 | 480 | Ethoxylated quaternary amine | ND | Alkoxylated fatty alcohol | ND | 7.5:1 |
| 163A | 38.4 | 480 | $C_{8-10}$ APA | 2.88 | Blend | 1.92 | 8:1 |
| 163B | 38.4 | 480 | $C_{8-10}$ APA | 2.40 | Blend | 2.40 | 8:1 |
| 163C | 38.4 | 480 | $C_{8-10}$ APA | 1.92 | Blend | 2.88 | 8:1 |
| 163D | 38.4 | 480 | Ethoquad C/12 | 2.16 | Blend | 1.92 | 8:1 |
| 163E | 38.4 | 480 | Ethoquad C/12 | 1.80 | Blend | 2.40 | 8:1 |

ND = not disclosed

Example 4. Greenhouse Bioefficacy Data of Glyphosate Formulations Containing $C_{8-10}$ Amidopropyl Dimethylamine Additional formulations were prepared containing glyphosate to surfactant ratios up to 4:1 ae:ai and tested for bioefficacy. Evaluations were done on POROL at application rates of 426 g a.e., 628 g a.e., 841 g a.e., and 1120 g a.e. per hectare of glyphosate.

Figure 4:
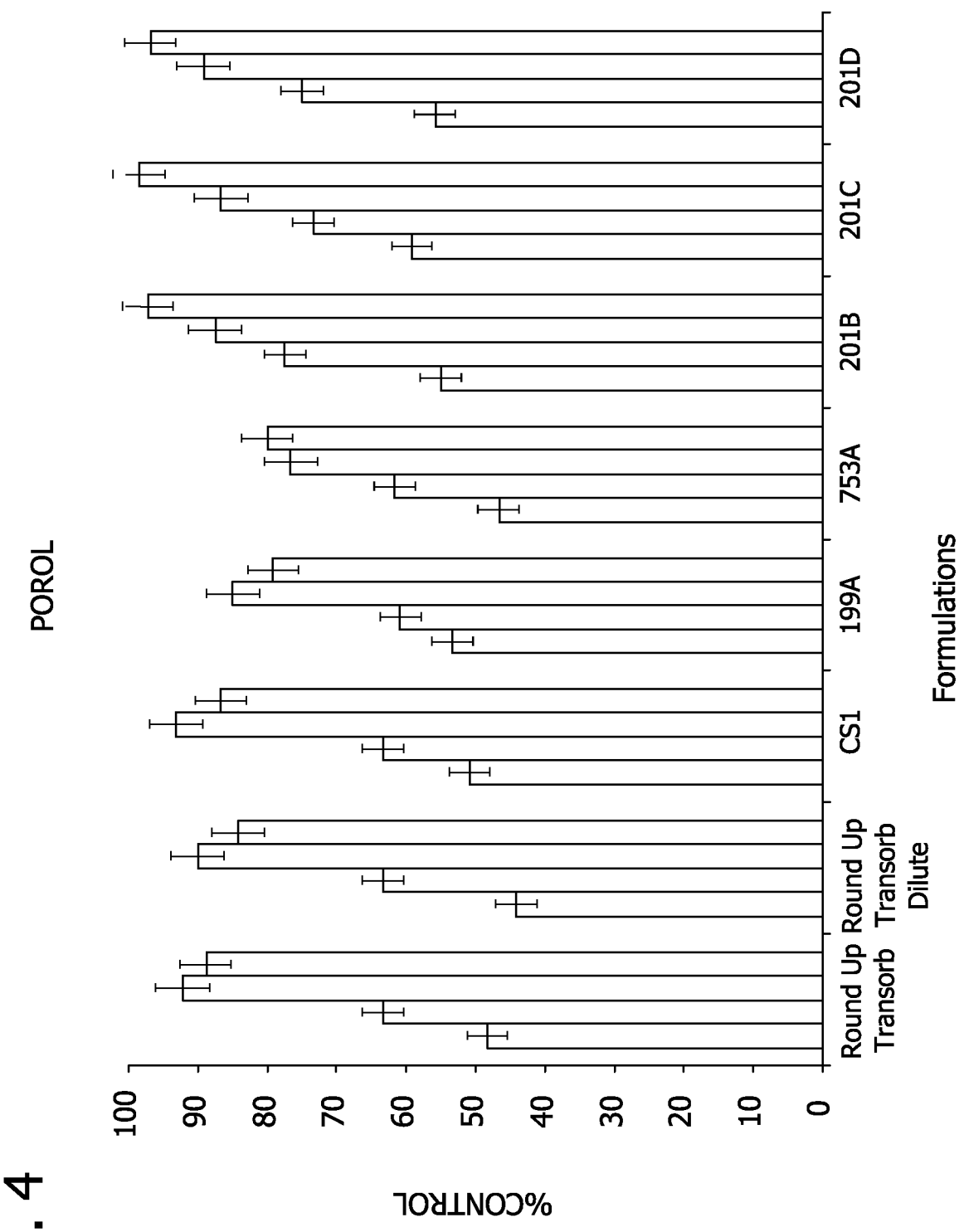
FIG. 4 is a graph of bioefficacy data from a greenhouse study. The test formulations included a $C_8$-$C_{10}$ amidopropyl dimethylamine surfactant at a glyphosate to surfactant ratio of 4:1. The data were obtained according to the method described in Example 4.

Diammonium glyphosate formulations (480 g a.e./L loadings) containing $C_{8-10}$ amidopropyl dimethylamine ("$C_{8-10}$ APA" in Table 4) blended with ethoxylated quaternary Greenhouse data are summarized in FIG. 4 wherein the first column for each formulation represents % POROL control at an application rate of 426 g a.e./ha glyphosate, the second column for each formulation represents % POROL control at an application rate of 628 g a.e./ha glyphosate, the third column for each formulation represents % POROL control at an application rate of 841 g a.e./ha glyphosate and the fourth column for each formulation represents % POROL control at an application rate of 1120 g a.e./ha glyphosate.

TABLE 4

Glyphosate Formulations Containing $C_{8-10}$ Amidopropyl Dimethylamine

| | Active amount, % a.e. by mass | Active amount g a.e./L | Salt Type | Total of All Surfactant Comps (%) | Surfactant 1 | Amount of surfactant 1 (%) | Surfactant 2 | Amount of surfactant 2 (%) | pH (5 wt. % dilution) |
|---|---|---|---|---|---|---|---|---|---|
| Transorb ® | 36.3 | 480 | K | ND | ND | ND | — | — | 4.5 |
| Transorb ® dilute | 36.3 | 480 | K | ND | ND | ND | — | — | 4.5 |
| 199A | 38.4 | 480 | 2(NH$_4$) | 9.60 | $C_{8-10}$ APA | 4.80 | Ethoquad T/18Q | 4.80 | 6.5 |
| 753A | 38.4 | 480 | 2(NH$_4$) | 9.60 | $C_{8-10}$ APA | 4.80 | Ethoquad T/20Q | 4.80 | 6.5 |
| CS1 | | 540 | K | ND | ND | ND | ND | ND | ND |
| 201B | 39.8 | 540 | K | 10.00 | $C_{8-10}$ APA | 4.00 | Ethomeen T/20 | 6.00 | 4.5 |
| 201C | 39.8 | 540 | K | 10.00 | $C_{8-10}$ APA | 5.00 | Ethomeen T/20 | 5.00 | 4.5 |
| 201D | 39.8 | 540 | K | 10.00 | $C_{8-10}$ APA | 6.00 | Ethomeen T/20 | 4.00 | 4.5 |

ND = not disclosed

Formulations 199A and 753A are diammonium glyphosate formulations (480 g a.e./L) containing blends of $C_{8-10}$ amidopropyl dimethylamine and ethoxylated quaternary tallowamine surfactants. Formulations 201B, 201C, and 201D are potassium glyphosate formulations (540 g a.e./L) that contain blends of $C_{8-10}$ amidopropyl dimethylamine and ethoxylated tertiary tallowamine surfactants. Because of the improved formulation stability offered by the $C_{8-10}$ amidopropyl dimethylamine, $C_{8-10}$ amidopropyl dimethylamine may be used in place of cocoamine 2 EO surfactants known in the art. Moreover, the level of ethoxylated tallowamine in the experimental formulations has been increased up to 60% of the total surfactant blend, which exceeds the content of current commercial standards. Replacement of cocoamine 2 EO surfactants with $C_{8-10}$ APA allows levels of tallowamine to be increased which improves formulation bioefficacy. Replacement of cocoamine 2 EO with $C_{8-10}$ APA has also been discovered to improve formulation compatibility with tank-mixed co-herbicides and reduce the level of eye irritation.

The bioefficacy improvement in the experimental formulations 201B, 201C, and 201D over the commercial product ("CS1") is illustrated by the data shown in FIG. 4. This improvement is especially evident at the low and high rates. Formulations 199A and 753A were statistically less efficacious than Roundup® Transorb® (4:1 glyphosate to surfactant ratio), but equal to Roundup® Transorb® dilute (5:1 glyphosate to surfactant ratio). The data suggest that combinations of $C_{8-10}$ amidopropyl dimethylamine and ethoxylated quaternary surfactants are less efficacious than combinations of $C_{8-10}$ amidopropyl dimethylamine and ethoxylated tertiary amine surfactants. The reason for this reduction in performance at more neutral pH is believed to be related to the less cationic nature of the amidopropyl dimethylamine surfactant at that pH.

Example 5. Formulation Stability Testing: Cloud Point Data

Cloud point is a parameter both for measuring storage stability and for evaluating compatibility of surfactants in high load potassium glyphosate salt formulations. Cloud point measurement methods are known in the art. The cloud point of a formulation is normally determined by heating the formulation until the solution becomes cloudy, and then allowing the formulation to cool, with agitation, while its temperature is continuously monitored. A temperature reading taken when the solution clears is a measure of cloud point. A cloud point of 50° C. or more is normally considered acceptable for most commercial purposes for a glyphosate concentrate formulation.

Potassium glyphosate and diammonium glyphosate formulations were prepared and subjected to cloud point testing. The formulation composition and resulting cloud points are reported in Table 5 wherein T20 refers to a tertiary tallow amine ethoxylate having 10E0 (Ethomeen T/20), C12Q refers to a quaternary cocoamine amine ethoxylate having 2E0 (Ethoquad C/12), $C_{8-10}$ APA refers to $C_{8-10}$ amidopropyl dimethylamine, T18 refers to a tertiary tallow amine ethoxylate having 8E0 (Ethomeen T/18), T20Q refers to a quaternary tallowamine amine ethoxylate having 10E0 (Ethoquad T/20) and C12 refers to a tertiary coco amine ethoxylate having 2E0 (Ethomeen C/12). In further reference to Table 5, the ratio of the surfactant is reported in parentheses. The potassium glyphosate salt formulations contained either 480 g a.e./L and 540 g a.e./L and were formulated with the objective of determining whether $C_{8-10}$ amidopropyl dimethylamine surfactant is a suitable replacement for cocoamine 2E0 surfactants. The diammonium glyphosate formulations contained 480 g a.e./L and were formulated with the objective of determining whether $C_{8-10}$ amidopropyl dimethylamine surfactant is a suitable replacement for quaternary cocoamine 2E0 surfactant.

Cloud point testing revealed that diammonium glyphosate formulations (480 g a.e./L) could be prepared with up to 120 g/L of $C_{8-10}$ amidopropyl dimethylamine and quaternary tallowamine surfactant blends containing up to 8 to 10 moles of ethoxylation on the quaternary tallowamine. The $C_{8-10}$ amidopropyl dimethylamine was shown to be a good compatibility agent for potassium glyphosate salt formulations containing 540 g a.e./L loading. A potassium glyphosate salt formulation (540 g a.e./L) containing 135 g/L surfactant at a 60/40 ratio of Ethomeen T20/APA was prepared with a cloud point over 65° C. This suggests that replacement of the cocoamine component of a potassium glyphosate formulation with $C_{8-10}$ amidopropyl dimethylamine could allow higher levels of tallowamine ethoxylate and reduced levels of coupling agent. The formulations prepared and the cloud point data associated with them are summarized in Table 5.

Each formulation prepared with cocoamine or quaternary cocoamine has a corresponding formulation prepared with $C_{8-10}$ amidopropyl dimethylamine. In all cases, a significant cloud point improvement was noted in samples containing $C_{8-10}$ amidopropyl dimethylamine surfactants versus cocoamine or quaternary cocoamine surfactants. These results suggest that $C_{8-10}$ amidopropyl dimethylamine surfactants are more efficient coupling agents than the cocoamine or quaternary cocoamine 2EO for ethoxylated quaternary amine and ethoxylated tertiary amine surfactants in formulations containing diammonium glyphosate salt and potassium glyphosate salt.

TABLE 5

Cloud points for Various formulations containing $C_{8-10}$ Amidopropyl Dimethylamine and Tertiary Amine or Quaternary Amine Coupling Agents

| Sample ID | Salt type | Glyphosate Loading (g a.e./L) | Blend Type | Blend Loading (g/L) | Specific Gravity | Cloud Point (° C.) |
|---|---|---|---|---|---|---|
| 203A | 2(NH$_4$) | 370 | T20/C12Q (60/40) | 45 | 1.197 | less than 40 |
| 203B | 2(NH$_4$) | 370 | T20/C$_{8-10}$ APA (60/40) | 45 | 1.197 | >80 |
| 203C | 2(NH$_4$) | 360 | T18/C12Q (70/30) | 60 | 1.194 | 43 |
| 203D | 2(NH$_4$) | 360 | T18/C$_{8-10}$ APA (70/30) | 60 | 1.193 | 67 |
| 203E | 2(NH$_4$) | 360 | T18/C12Q (70/30) | 72 | 1.194 | less than 40 |
| 203F | 2(NH$_4$) | 360 | T18/C$_{8-10}$ APA (70/30) | 72 | 1.193 | 64 |
| 203G | 2(NH$_4$) | 360 | T18/C12Q (55/45) | 90 | 1.194 | 63 |
| 203H | 2(NH$_4$) | 360 | T18/C$_{8-10}$ APA (55/45) | 90 | 1.191 | >80 |
| 203I | 2(NH$_4$) | 480 | T20Q/C12Q (50/50) | 120 | unstable | unstable |
| 203J | 2(NH$_4$) | 480 | T20Q/C$_{8-10}$ APA (40/60) | 120 | 1.250 | less than 60 |
| 203K | 2(NH$_4$) | 480 | T20Q/C12Q (50/50) | 96 | unstable | unstable |
| 203L | 2(NH$_4$) | 480 | T20Q/C$_{8-10}$ APA (40/60) | 96 | 1.250 | >80 |
| 203M | 2(NH$_4$) | 480 | T20Q/C12Q (50/50) | 80 | unstable | unstable |
| 203N | 2(NH$_4$) | 480 | T20Q/C$_{8-10}$ APA (50/50) | 80 | 1.244 | >80 |
| 203O | 2(NH$_4$) | 480 | T20Q/C12Q (50/50) | 60 | unstable | unstable |
| 203P | 2(NH$_4$) | 480 | T20Q/C$_{8-10}$ APA (50/50) | 60 | 1.247 | >80 |
| 202A | K | 540 | T20/C12 (60/40) | 135 | 1.365 | less than 40 |
| 202B | K | 540 | T20/C$_{8-10}$ APA (60/40) | 135 | 1.365 | 68 |
| 202C | K | 480 | T20/C12 (80/20) | 120 | unstable | unstable |
| 202D | K | 480 | T20/C$_{8-10}$ APA (80/20) | 120 | unstable | unstable |
| 202E | K | 480 | T20/C12 (70/30) | 120 | 1.329 | 46 |
| 202F | K | 480 | T20/C$_{8-10}$ APA (70/30) | 120 | 1.329 | >80 |

Example 6. Formulation Stability Testing at −10° C. and 60° C.

The potassium glyphosate and diammonium glyphosate formulations from Example 5 were subjected to storage stability testing at cold and hot temperatures. Table 6 summarizes the storage stability results of those formulations at both 60° C. and −10° C.

Seven of the formulations prepared remained clear and stable after 4 weeks of storage at 60° C. and −10° C. All seven of those formulations contained $C_{8-10}$ amidopropyl dimethylamine surfactant. This Example illustrates the compatibility improvement provided by the $C_{8-10}$ amidopropyl dimethylamine surfactant of the present invention as compared to the prior art ethoxylated cocoamine and quaternary cocoamine surfactants.

The stability of these formulations can be affected by adjusting the ratio of $C_{8-10}$ amidopropyl dimethylamine to ethoxylated amine or quaternary amine. Reformulating unstable formulations 203F, 203J and 203L with increased levels of the $C_{8-10}$ amidopropyl dimethylamine resulted in improved stability. The reformulated samples are described in Table 7 as 214A, 214B, 214C, 214D, and 214E. These formulations were stored for two weeks at −10° C. and 60° C. After 2 weeks, all were stable at −10° C. All formulations except 214B were stable at 60° C.

TABLE 6

| Sample ID | Stability (−10° C.) | Stability (60° C.) |
|---|---|---|
| 203A | clear and stable | unstable @ 1 week |
| 203B | clear and stable | clear and stable |
| 203C | clear and stable | unstable @ 1 week |
| 203D | clear and stable | clear and stable |

TABLE 6-continued

| Sample ID | Stability (−10° C.) | Stability (60° C.) |
|---|---|---|
| 203E | clear and stable | unstable @ 1 week |
| 203F | clear and stable | unstable @ 1 week |
| 203G | clear and stable | unstable @ 1 week |
| 203H | clear and stable | clear and stable |
| 203I | unstable @ RT | unstable @ RT |
| 203J | unstable @ 1 week | unstable @ 1 week |
| 203K | unstable @ RT | unstable @ RT |
| 203L | unstable @ 2 weeks | unstable @ 2 weeks |
| 203M | unstable @ RT | unstable @ RT |
| 203N | clear and stable | clear and stable |
| 203O | unstable @ RT | unstable @ RT |
| 203P | clear and stable | clear and stable |
| 202A | clear and stable | unstable @ 1 week |
| 202B | clear and stable | clear and stable |
| 202C | unstable @ RT | unstable @ RT |
| 202D | unstable @ RT | unstable @ RT |
| 202E | clear and stable | unstable @ 1 week |
| 202F | clear and stable | clear and stable |

TABLE 7

| Sample ID | Salt type | Glyphosate Loading (g a.e./L) | Blend Type | Blend Loading (g/L) | Specific Gravity | Cloud Point (° C.) | Stability (2 weeks) |
|---|---|---|---|---|---|---|---|
| 214A | 2(NH$_4$) | 360 | T18/C$_{8-10}$ APA (60/40) | 72 | 1.191 | >80 | stable |
| 214B | 2(NH$_4$) | 480 | T20Q/C$_{8-10}$ APA (40/60) | 120 | 1.250 | less than 60 | unstable @ 60 |
| 214C | 2(NH$_4$) | 480 | T20Q/C$_{8-10}$ APA (40/60) | 96 | 1.250 | >80 | stable |
| 214D | 2(NH$_4$) | 480 | T18Q/C$_{8-10}$ APA (50/50) | 120 | 1.250 | >80 | stable |
| 214E | 2(NH$_4$) | 480 | T18Q/C$_{8-10}$ APA (50/50) | 96 | 1.250 | >80 | stable |

The following conclusions may be made from the results of Examples 1 through 6. Amidoalkylamine surfactants are efficient coupling agents for ethoxylated tertiary amine and ethoxylated quaternary amine surfactants in high load potassium glyphosate and diammonium glyphosate formulations, respectively. The hydrocarbyl chain of this class of surfactants plays an important role in the physical properties of the end formulation. Cocoamidopropyl amine surfactants (Adsee C80W) increased the viscosity of 480 g a.e./L diammonium formulations when added at concentrations greater than 58 g/L. The C$_{8-10}$ amidopropyl dimethylamine surfactants had little effect on formulation viscosity. Formulations prepared with the C$_{8-10}$ amidopropyl dimethylamine surfactants had acceptable viscosity even at a surfactant loading of 120 g/L.

Greenhouse bioefficacy studies indicated that blends of amidoalkylamine surfactants with ethoxylated tertiary amines and ethoxylated quaternary amines are effective delivery systems for glyphosate. This may be due in part to the improved formulation stability that allows for the formulation of higher levels of ethoxylated tertiary tallowamine surfactants to be used in high load potassium glyphosate formulations and higher levels of ethoxylated quaternary amine surfactants in high load diammonium glyphosate formulations. The data suggest improved performance of the amidoalkylamine surfactants when combined with ethoxylated tertiary amine surfactants more so than ethoxylated quaternary amine surfactants.

Formulation stability studies indicated that C$_{8-10}$ amidopropyl dimethylamine surfactants are more efficient coupling agents than cocoamine and quaternary ethoxylated cocoamine (2 EO). For example, a high load potassium glyphosate formulation (540 g a.e./L) prepared with 135 g/L surfactant required a 55/45 wt % blend of tallowamine 10 EO and cocoamine 2E0 to have a cloud point of 60° C. This same formulation could be prepared at a 60/40 wt % blend of tallowamine 10 EO and C$_{8-10}$ amidopropyl dimethylamine. The increased levels of tallowamine ethoxylate improve formulation bioefficacy. Accordingly, amidoalkylamine surfactants offer new opportunities to develop high load glyphosate formulations, and amidoalkylamine surfactants are suitable substitutes for 2 EO cocoamine surfactants.

Example 7. Compatibilization with Co-Herbicides

In some glyphosate formulations, it is advantageous to incorporate a co-herbicide into the spray tank to enhance bioefficacy, to induce early appearance of visual phytotoxic effects in treated plants, or both. In this regard, amidoalkylamine surfactants have been discovered to enhance the stability of high load glyphosate formulations further comprising a tank mixed co-herbicide.

High load potassium glyphosate formulations were prepared comprising the components as shown in the following Table 8 wherein T20 is tertiary tallow amine ethoxylate having 10 moles of EO and APA is C$_{8-10}$ amidopropyl dimethylamine.

TABLE 8

| Sample ID | Salt type | Glyphosate Loading (g a.e./L) | Blend Type | Blend Loading (g/L) | pH |
|---|---|---|---|---|---|
| 922A | K | 540 | T20/C$_{8-10}$ APA (60/40) | 135 | 4.5 |
| 922B | K | 540 | T20/C$_{8-10}$ APA (55/45) | 135 | 5.0 |

Eight glyphosate samples were prepared in hard water and further comprising a co-herbicide. Two samples (100 mL each) were prepared from 922A, and two samples (100 mL each) were prepared from 922B. Two comparative samples (100 mL each) were prepared from a commercial product (designated "CS1" in Tables 9A and 9B) containing 540 g a.e./L of glyphosate potassium salt and described in U.S. Pat. No. 6,365,551, and two additional comparative samples (100 mL each) were prepared from a second commercial standard (designated "CS2" in Tables 9A and 9B) containing 540 g a.e./L of glyphosate potassium salt. Each of sample was prepared according to the following protocol:

1) Fill a Nesslar tube with a pre-determined amount of 342 ppm hardness water.
2) Add ammonium sulfate if necessary; mix until dissolved.
3) Add a co-herbicide. In one sample of each formulation, (2,4-dichlorophenoxy)acetic acid (2,4-D) was added (total volume of 2.5 mL). In the other sample of each formulation, Direx (diuron) was added (total volume of 4 mL).
4) Add the glyphosate formulation.
5) Invert Nesslar tube 10 times.
6) Evaluate for precipitate immediately, at 1 hour, and at 2 hours.
7) Let stand for 24 hours
8) Evaluate for precipitation/haziness and determine number of inversions necessary to re-disperse.

The observed results are shown in Tables 9A (samples comprising 2,4-D co-herbicide) and 9B (samples comprising Direx).

TABLE 9A

| Sample ID | Immediate | Time to Precipitate Formation |
|---|---|---|
| CS1 | Clear | 14 minute |
| CS2 | Hazy | 4.5 minutes |
| 922A | Hazy | 14 minutes |
| 922B | Clear | Clear after 7 hours |

TABLE 9B

| Sample ID | Immediate | After 2 hours |
|---|---|---|
| CS1 | Immediate Flocculation | Direx settles to bottom |
| CS2 | Immediate Flocculation | Direx settles to bottom |
| 922A | Remains in Suspension | Slight top clearing; solution in suspension |
| 922B | Remains in Suspension | Slight top clearing; solution in suspension |

Based on the above observations, it is apparent that the blend of tertiary tallow amine ethoxylate having 10 moles of EO and $C_{8-10}$ amidopropyl dimethylamine enhances the compatibility of co-herbicides within high potassium glyphosate load herbicidal compositions, compared to current commercial formulations.

Example 8. Eye Toxicity Improvement

In some glyphosate formulations it has been shown as advantageous to the biological efficacy to incorporate a surfactant. Common surfactants used in the art include tertiary amine ethoxylates. Glyphosate formulations containing tertiary amine ethoxylate surfactants are sometimes known to be irritating to the eyes. Formulations prepared with a blend of tertiary amine ethoxylates and amidoalkylamine surfactants have been discovered to be less irritating to the eyes than formulations containing tertiary amine ethoxylates alone and even in some cases can mitigate the irritation caused by similar levels of ethoxylated tertiary tallowamine surfactants.

Two potassium glyphosate formulations (540 g a.e./L) comprising a blend of surfactants (135 g/L) were prepared. One glyphosate formulation contained a blend of tertiary tallowamine ethoxylate having 10 moles EO and $C_9$-amidopropyl dimethylamine. The other formulation contained a blend of tertiary tallowamine ethoxylate having 10 moles EO and a tertiary cocoamine ethoxylate having 2 mols EO.

Both formulations were tested for eye irritation using a standard eye irritation screen. Each of three New Zealand White Rabbits received a 0.1 mL dose of the test substance in the conjunctival sac of the right eye. The contralateral eye of each animal remained untreated and served as a control. Test and control eyes were examined for signs of irritation for up to 10 days.

The glyphosate formulation containing the blend of tertiary tallowamine ethoxylate with 10 mols EO and tertiary cocoamine ethoxylate with 2 moles EO, exposure to the test article produced corneal opacity in 1/3 test eyes at the 1-hour scoring interval. The corneal opacity was confirmed by positive fluorescein dye retention at the 24-hour scoring interval. The corneal opacity resolved in the test eye by the 72-hour scoring interval. Iritis was observed in 2/3 test eyes at the 1-hour scoring interval which resolved completely by the 48-hour scoring interval. The conjunctival irritation resolved completely in all test eyes by study-day 10.

The glyphosate formulation containing the blend of tertiary tallowamine ethoxylate with 10 moles EO and $C_9$-amidopropyl dimethylamine, exposure to the test article did not produce corneal opacity in any of the test eyes exposed. Iritis was observed in 3/3 test eyes at the 1-hour scoring interval which resolved completely by the 48-hour scoring interval. Conjunctival irritation resolved completely in all test eyes by 72 hours after exposure.

Based on the above results, it is apparent that 540 g a.e./L potassium glyphosate formulations containing a blend of tertiary tallowamine ethoxylate having 10 moles EO and $C_9$-amidopropyl dimethylamine are less irritating to the eyes than blends of tertiary amine ethoxylates. This is especially illustrated by the reduction in corneal effects in that sample compared to the sample containing the tertiary cocoamine ethoxylate.

Example 9. Amidoalkylamine Coupling Experiments

The ability of amidoalkylamine surfactants to compatibilize a wide variety of co-surfactants was tested in high load potassium glyphosate formulations. Glyphosate formulations were prepared containing potassium glyphosate at a loading of 39.7 wt. % (about 540 g a.e./L). Every formulation contained at least a primary surfactant (Surfactant A in Table 10), at 8.0 wt. % (about 108 g/L). The control formulations contained only the primary Surfactant A. The test formulations contained the same amount of primary Surfactant A and an additional amount of $C_9$-amidopropyl dimethylamine coupling agent (C9 APA in Table 10) at 2.0 wt. % (about 27 g/L), 3.0 wt. % (about 40.5 g/L), or 4 wt. % (about 54 g/L). The observed stability at room temperature and cloud point data are shown in Table 10.

TABLE 10

| Sample ID | Surfactant A | Wt. % of C9 APA | Stability at Room Temperature | Cloud Point (° C.) |
|---|---|---|---|---|
| 802A | Alkoxylated Etheramine Ethoxylate | 0.0 | Stable | 67 |
| 802B | Alkoxylated Etheramine Ethoxylate | 2.0 | Stable | >80 |
| 802C | TOMAH E-17-5 | 0.0 | Unstable | NA |
| 802D | TOMAH E-17-5 | 2.0 | Stable | 65 |
| 802E | Oxide of etheramine | 0.0 | Unstable | NA |
| 802f | Oxide of etheramine | 2.0 | Stable | 68 |
| 802G | Phosphate ester of alkyletheramine | 0.0 | Stable | 40 |
| 802H | Phosphate ester of alkyletheramine | 2.0 | Stable | >80 |
| 802I | TOMAH AO-17-7 | 0.0 | Unstable | NA |
| 802J | TOMAH AO-17-7 | 2.0 | Unstable | NA |
| 802K | TOMAH AO-17-7 | 3.0 | Unstable | NA |
| 802L | TOMAH AO-17-7 | 4.0 | Stable | 54 |
| 802M | AROMOX C/12 | 0.0 | Unstable | NA |
| 802N | AROMOX C/12 | 2.0 | Stable | NA |

TOMAH E-17-5 is poly(5)oxyethylene isotridecyloxypropylamine having the structure:

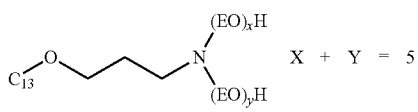

X + Y = 5

TOMAH AO-17-7 is poly(7)oxyethylene isotridecyloxypropylamine oxide having the structure:

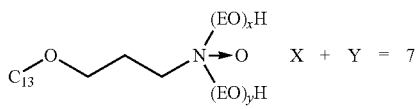

X + Y = 7

AROMOX C/12 is bishydroxyethylcocoamine oxide having the structure:

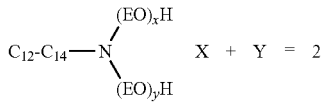

X + Y = 2

The data of Table 10 show that amidoalkylamine surfactants enable the preparation of stable high load glyphosate with a wide variety of co-surfactants. In each experiment, the high load glyphosate formulations containing primary Surfactant A only were either unstable and thus incompatible with a high load glyphosate formulation or the stability of the formulation was improved by the addition of an amidoalkylamine coupling agent. In Table 10, a demarcation of "unstable" indicates that the glyphosate formulation was characterized by a two phase composition. While some surfactants yield stable compositions, those surfactants that yielded unstable compositions became stable with the addition of $C_9$-amidopropyl dimethylamine. In each formulation test, except for those containing AROMOX C/12, addition of $C_9$-amidopropyl dimethylamine increased the cloud point, further showing improved formulation stability. With regard to AROMOX C/12, although a cloud point improvement was not observed, the addition of $C_9$-amidopropyl dimethylamine caused the two-phase composition to stabilize into a single phase.

Example 10. Herbicidal Compositions Comprising Blends of Glyphosate Salts

The cloud point stability of a variety of high load glyphosate formulations comprising a blend of glyphosate salts was studied. Each formulation comprised a blend of potassium glyphosate and monoethanolamine glyphosate at a glyphosate loading of 540 g a.e./L and a weight ratio of potassium glyphosate in g a.e. to monoethanolamine glyphosate in g a.e. of 70:30.

Samples 820D through 820F are test formulations that comprised a blend of potassium glyphosate and monoethanolamine glyphosate at a glyphosate loading of 540 g a.e./L and a weight ratio of potassium glyphosate in g a.e. to monoethanolamine glyphosate in g a.e. of 70:30 and further comprising Ethomeen T/20, available from Akzo Nobel and $C_9$-amidopropyl dimethylamine coupling agent (C9 APA in Table 11). The surfactant loadings of samples 820D, 820E, and 820F were 130 g/L, 120 g/L, and 110 g/L, respectively, and the weight ratio of Ethomeen T/20 in grams to $C_9$-amidopropyl dimethylamine coupling agent in grams was 65:35, 70:30, and 70:30, respectively.

For comparison, samples 820A through 820C are formulations that comprised a blend of potassium glyphosate and monoethanolamine glyphosate at a glyphosate loading of 540 g a.e./L and a weight ratio of potassium glyphosate in g a.e. to monoethanolamine glyphosate in g a.e. of 70:30 and further comprising a blend of Ethomeen T/20 and Ethomeen C/12, both available from Akzo Nobel. The surfactant loadings of samples 820A, 820B, and 820C were 130 g/L, 120 g/L, and 110 g/L, respectively, and the weight ratio of Ethomeen T/20 in grams to Ethomeen C/12 in grams was 60:40, 65:35, and 65:35, respectively.

Samples 842A, 612H, and 612I are formulations that comprised a blend of potassium glyphosate and monoethanolamine glyphosate at a glyphosate loading of 540 g a.e./L and a weight ratio of potassium glyphosate in g a.e. to monoethanolamine glyphosate in g a.e. of 70:30 and further comprising a blend of Ethomeen T/20 and Ethomeen C/12, both available from Akzo Nobel. The surfactant loadings of samples 842A, 612H, and 612I were 130 g/L, 120 g/L, and 110 g/L, respectively, and the weight ratio of Ethomeen T/20 in grams to Ethomeen C/12 in grams was 65:35, 70:30, and 70:30, respectively.

Samples 842B, 842C, and 842D are formulations that comprised a blend of potassium glyphosate and monoethanolamine glyphosate at a glyphosate loading of 540 g a.e./L and a weight ratio of potassium glyphosate in g a.e. to monoethanolamine glyphosate in g a.e. of 70:30 and further comprising a Ethomeen T/20 alone. The surfactant loadings of samples 842A, 612H, and 612I were 130 g/L, 120 g/L, and 110 g/L, respectively.

Table 11 below illustrates the improved compatibility offered by amidoalkylamine surfactants in formulations comprising a blend of glyphosate salts.

TABLE 11

| Sample ID | Surf Loading | Surf Desc. | Cloud Point (° C.) | SG | pH |
|---|---|---|---|---|---|
| 820D | 130 | Ethomeen 120/C9 APA | >80 | 1.338 | 4.65 |
| 820E | 120 | Ethomeen 120/C9 APA | >80 | 1.341 | 4.63 |
| 820F | 110 | Ethomeen 120/C9 APA | >80 | 1.341 | 4.6 |
| 820A | 130 | Ethomeen T20/ Ethomeen C12 | 71 | 1.338 | 4.63 |
| 820B | 120 | Ethomeen T20/ Ethomeen C12 | 67 | 1.341 | 4.61 |
| 820C | 110 | Ethomeen T20/ Ethomeen C12 | 71 | 1.341 | 4.59 |
| 842A | 130 | Ethomeen T20/ Ethomeen C12 | 59 | 1.338 | 4.65 |
| 612H | 120 | Ethomeen T20/ Ethomeen C12 | 52 | 1.341 | 4.61 |
| 612I | 110 | Ethomeen T20/ Ethomeen C12 | 57 | 1.342 | 4.59 |
| 842B* | 130 | Ethomeen T20 | unstable | 1.388 | 4.6 |
| 842C* | 120 | Ethomeen T20 | unstable | 1.341 | 4.6 |
| 842D* | 110 | Ethomeen T20 | unstable | 1.341 | 4.6 |

ND = not disclosed
*Specific Gravity and pH not measured. Values are estimates based on similar formulations. These samples were unstable at Room temp.

Formulations that contained a blend of Ethomeen T/20 and $C_9$-amidopropyl dimethylamine coupling agent with elevated levels of tallowamine ethoxylate showed cloud points of >80° C., which was more than 20° C. higher for the corresponding formulations made with a blend of Ethomeen T/20 and Ethomeen C/12 formulations with the same level of tallowamine. In some instances, the relatively lower cloud point means that some formulations, such as 612H, may be prone to failure under commercial storage conditions. The cloud point increase illustrates the stability improvement offered by the amidoalkylamine surfactants compared to cocoamine 2 EO in this mixed salt system. Furthermore, this example illustrates the feasibility of preparing highly loaded glyphosate formulations with blends of salts. More specifically this example details the preparation of highly loaded glyphosate formulations containing amido alkylamine surfactants and at least one other surfactant not by itself stable in that salt or blend of salts of glyphosate.

Example 11. Herbicidal Compositions Comprising Blends of Glyphosate Salts and Compatibilization with Co-Herbicides The cloud point stability of a variety of high load glyphosate formulations comprising a blend of glyphosate salts was studied. These formulations were additionally tested for their compatibility with co-herbicide (2,4-dichlorophenoxy) acetic acid (2,4-D). The results of these studies are shown below in Table 12. The glyphosate load in every sample was 480 g a.e./L, obtained by adding potassium glyphosate. In some samples, aqueous ammonium was added such that these samples comprised a blend of potassium and ammonium glyphosate salts.

In every sample, surfactant 1 was Ethomeen T/20, available from Akzo Nobel. In those samples wherein surfactant 2 was added, surfactant 2 was $C_{8-10}$-amidopropyl dimethylamine coupling agent.

To test the compatibility of each formulation with 2,4-D, the herbicidal concentrate solution was added dropwise to a solution of 2,4-D dimethylamine. The 2,4-D dimethylamine solution was stirred with a magnetic stirrer during dropwise addition. Dropwise addition continued until the solution became turbid. The 2,4-D dimethylamine was prepared by adding 7.7 g of 2,4D dimethylamine (46.9% 2,4-D) from Riverside/Terra Corp. to a beaker containing 86 g of deionized water. Upon becoming turbid, the beaker was weighed to determine the amount of formulation added. That weight was recorded.

TABLE 12

| Sample ID | 29% NH$_4$ by mass (%) | Wt. % of Surfactant 1 | Wt. % of Surfactant 2 | Cloud Point (°) | 2,4-D Compatibility Test Result |
|---|---|---|---|---|---|
| 718A | 0 | 5 | 0 | unstable | n |
| 718C | 1.5 | 5 | 2 | >90 | 7 |
| 718D | 3 | 5 | 4 | >90 | 6.3 |
| 718E | 1.5 | 6 | 0 | unstable | n |
| 718F | 3 | 6 | 2 | 40 | 8.8 |
| 718G | 0 | 6 | 4 | >90 | 4.3 |
| 718H | 3 | 8 | 0 | unstable | n |
| 718I | 0 | 8 | 2 | unstable | n |
| 718J | 1.5 | 8 | 4 | 72 | 10.4 |
| 718K | 0 | 5 | 1 | 61 | 6.4 |
| 718L | 1.51 | 6 | 1 | unstable | 3.6 |
| 718M | 3.1 | 8 | 1 | unstable | n |
| 718N | 0 | 8 | 2 | unstable | 3.5 |
| 718O | 1.5 | 7 | 2 | unstable | 4.7 |
| 718P | 1.5 | 6 | 2 | 47 | 4.8 |
| 718Q | 3 | 6 | 3 | 35 | 15.3 |
| 718R | 1.3 | 6 | 3 | 75 | 14.5 |
| 718S | 2 | 6.3 | 3 | 59 | 9.8 |
| 718T | 1.5 | 7.1 | 3 | 43 | 7.2 |
| 729A | 0 | 5 | 1 | 57 | 3 |
| 729B | 2.5 | 6 | 2 | unstable | n |
| 729C | 2.5 | 5 | 2 | 47 | 5.4 |
| 729D | 2.5 | 5.5 | 1.5 | unstable | n |
| 729E | 2 | 5 | 2 | 62 | 4.3 |
| 729F | 2 | 4 | 1 | 25 | 4.4 |
| 729G | 3 | 4 | 2 | 68 | 3.8 |
| 730H | 3 | 4 | 3 | 72 | 3.5 |
| 731I | 2.5 | 5 | 3 | >90 | 4.2 |
| 731J | 3 | 5 | 3 | >90 | 4.3 |
| 731K | 3.5 | 5 | 3 | >90 | 4.9 |
| 731L | 4 | 5 | 2 | 68 | 4.4 |
| 731M | 4.5 | 4 | 3 | >90 | 6 |
| 731N | 5.5 | 4 | 3 | >90 | 6 |
| 731O | 6 | 4 | 3 | >90 | 6.6 |
| 731P | 7 | 4 | 3 | >90 | n |
| 731Q | 10 | 4 | 3 | 68 | 6 |
| 731R | 4.5 | 4.5 | 2.5 | >90 | 5.2 |
| 731S | 9 | 4 | 3 | 77 | 9.5 |
| 731T | 10 | 4 | 3 | 62 | 7.8 |

N = not tested

The results of Table 12 indicate that the inclusion of $C_{8-10}$-amidopropyl dimethylamine coupling agent increased the cloud point of the formulation.

Example 12. High Load Glyphosate Formulations

Several formulations were prepared comprising glyphosate loads greater than 560 g a.e./L of potassium glyphosate and tested by cloud point studies for stability. The results of these studies are shown below in Table 13. In each formulation, Surfactant 1 ("Surf. 1") is Ethomeen T/20, available from Akzo Nobel. Surfactant 2 ("Surf. 2"), where added, is Ethomeen C/12 available from Akzo Nobel. Surfactant 3 ("Surf. 3") is $C_9$-amidopropyl dimethylamine coupling agent. In Table 13, Stability pertains to the appearance of a precipitate after the formulation was held at 0° C. for 1 month.

TABLE 13

| Active amount, % ae by mass | Active Amount g a.e./L | Wt. % Surf. 1 | Wt. % Surf. 2 | Wt. % Surf. 3 | Cloud Point (° C.) | Stability |
|---|---|---|---|---|---|---|
| 40.85 | 560 | 7 | 3 | 0 | 53 | no crystals |
| 40.85 | 560 | 4.9 | 2.1 | 3 | >90 | no crystals |
| 40.85 | 560 | 3.5 | 1.5 | 5 | >90 | no crystals |
| 40.85 | 560 | 2.1 | 0.9 | 7 | >90 | no crystals |
| 40.85 | 560 | 6 | 0 | 4 | 64 | no crystals |
| 40.85 | 560 | 7 | 0 | 3 | unstable | no crystals |
| 40.85 | 560 | 5.5 | 0 | 4.5 | 86 | no crystals |
| 41.45 | 572 | 6 | 0 | 4 | 50 | no crystals |
| 41.45 | 572 | 5.5 | 0 | 4.5 | 79 | no crystals |

In view of the results shown in Table 13, it is apparent that $C_9$-amidopropyl dimethylamine coupling agent is an effective coupling agent for stabilizing high glyphosate load formulations as shown by the cloud point study and long term stability at 0° C.

Example 13. Glyphosate Formulations Containing a Blend of Amidoalkylamine Surfactants and Alkoxylated Alcohol Co-Surfactants The ability of amidoalkylamine surfactants to compatibilize alkoxylated alcohols and form stable formulations with these co-surfactants was tested in high load potassium glyphosate formulations. Glyphosate formulations were prepared containing potassium glyphosate at a loading of 39.7 wt. % (about 540 g a.e./L). Every formulation contained at least an alkoxylated alcohol surfactant. In Table 14, the identities of the alkoxylated alcohol surfactant are as follows: (1) Ethoxylated Alcohol A is a $C_{16,18}$ alcohol ethoxylated with an average of 20 moles EO, (2) Ethoxylated Alcohol B is a $C_{16,18}$ alcohol ethoxylated with an average of 15 moles EO, (3) Ethoxylated Alcohol C is a $C_{12,16}$ alcohol ethoxylated with an average of 22 moles EO, (4) Ethoxylated Alcohol D is a $C_{12,16}$ alcohol ethoxylated with an average of 7 moles EO, and (5) Ethoxylated Alcohol E is a $C_{10,12}$ alcohol ethoxylated with an average of 8 moles EO. Control formulations contained only the alcohol surfactant, while in test formulations, a $C_9$-amidopropylamine ("C9 APA") coupling agent was added. The relative amounts of each surfactant were varied as shown in Table 14. The formulations were observed for stability at room temperature, and the results are shown in Table 14.

TABLE 14

| Sample ID | Alkoxylated alcohol | Wt. % Alkoxylated Alcohol | Wt. % C9 ARA | Stability at Room Temperature |
|---|---|---|---|---|
| 863A | Ethoxylated Alcohol A | 8.10 | 0.00 | Unstable |
| 863B | Ethoxylated Alcohol A | 4.05 | 4.05 | Unstable |
| 863C | Ethoxylated Alcohol A | 2.03 | 6.08 | Unstable |
| 863D | Ethoxylated Alcohol B | 8.10 | 0.00 | Unstable |
| 863E | Ethoxylated Alcohol B | 4.05 | 4.05 | Unstable |
| 863F | Ethoxylated Alcohol B | 2.03 | 6.08 | Unstable |
| 863G | Ethoxylated Alcohol C | 8.10 | 0.00 | Unstable |
| 863H | Ethoxylated Alcohol C | 4.05 | 4.05 | Unstable |
| 863I | Ethoxylated Alcohol C | 2.03 | 6.08 | Unstable |
| 863J | Ethoxylated Alcohol D | 8.10 | 0.00 | Unstable |
| 863K | Ethoxylated Alcohol D | 4.05 | 4.05 | Stable |
| 863L | Ethoxylated Alcohol D | 2.03 | 6.08 | Stable |
| 863M | Ethoxylated Alcohol E | 8.10 | 0.00 | Unstable |
| 863N | Ethoxylated Alcohol E | 4.05 | 4.05 | Stable |
| 863O | Ethoxylated Alcohol E | 2.03 | 6.08 | Stable |

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:
1. An aqueous herbicidal concentrate solution comprising:
(a) a glyphosate component comprising a salt of glyphosate in a concentration greater than 300 grams acid equivalent per liter, wherein the glyphosate component does not contain the isopropylamine salt of glyphosate, the n-propylamine salt of glyphosate or a combination thereof;
(b) an amidoalkylamine surfactant of structure (I):

Structure (I)

wherein $R_1$ is hydrocarbyl having from 1 to about 22 carbon atoms, $R_2$ and $R_3$ are each independently hydrocarbyl having from 1 to about 6 carbon atoms, and $R_4$ is hydrocarbylene having from 1 to about 6 carbon atoms; and
(c) a co-surfactant comprising an alkoxylated tertiary amine oxide surfactant of structure (VII):

Structure (VII)

wherein, in structure (VII), $R_1$ is hydrocarbyl having from about 4 to about 22 carbon atoms; $R_2$ and $R_3$ are each independently hydrocarbylene having 2, 3, or 4 carbon atoms; and the sum of x and y is an average value ranging from about 2 to about 50; and
wherein the mass concentration ratio of the amidoalkylamine surfactant of structure (I) to total co-surfactant is from 5:1 to about 1:5.
2. The solution of claim 1 wherein, in structure (I), $R_1$ is alkyl having an average of from about 4 carbon atoms to about 18 carbon atoms, $R_2$ and $R_3$ are each alkyl having from 1 to 4 carbon atoms, and $R_4$ is alkylene having from 1 to 4 carbon atoms.
3. The solution of claim 1 wherein, in structure (I), $R_1$ is alkyl having an average of from about 5 carbon atoms to about 12 carbon atoms, $R_2$ and $R_3$ are each methyl and $R_4$ is n-propylene.
4. The solution of claim 1 wherein the glyphosate salt is selected from the group consisting of the diammonium salt, the potassium salt, the monoethanolamine salt, and combinations thereof.
5. The solution of claim 1 wherein the solution has a cloud point that is at least about 50° C.
6. The solution of claim 1 wherein the glyphosate component is at least 90% by weight potassium salt of glyphosate.
7. The solution of claim 3 wherein, in structure (VII), $R_1$ is alkyl having from about 4 to about 22 carbon atoms; and the sum of x and y is an average value ranging from about 2 to about 22.
8. The solution of claim 7 wherein, in structure (VII), $R_1$ is an alkyl having from about 8 to about 18 carbon atoms; $R_2$ and $R_3$ are each ethylene; and the sum of x and y is an average value ranging between about 10 and about 20.
9. The solution of claim 3 wherein the mass concentration ratio of the amidoalkylamine surfactant of structure (I) to total co-surfactant is less than about 45:55.
10. The solution of claim 3 wherein the mass concentration ratio of the amidoalkylamine surfactant of structure (I) to total co-surfactant is less than about 35:65.

11. The solution of claim 3 wherein the weight ratio of glyphosate in grams acid equivalent to total surfactant in grams is from about 2:1 to about 10:1.

12. The solution of claim 3 wherein the glyphosate concentration is greater than about 360 grams acid equivalent per liter.

13. The solution of claim 3 wherein the glyphosate concentration is greater than about 480 grams acid equivalent per liter.

14. The solution of claim 3 further comprising a co-herbicide.

15. A herbicidal method for killing or controlling unwanted plants, the method comprising applying to the foliage of the unwanted plants an application mixture formed by diluting the aqueous herbicidal concentrate solution of claim 1 with water.

16. An aqueous herbicidal concentrate solution comprising:
(a) a glyphosate component comprising a salt of glyphosate in a concentration greater than 300 grams acid equivalent per liter, wherein the glyphosate component does not contain the isopropylamine salt of glyphosate, the n-propylamine salt of glyphosate or combination thereof;
(b) an amidoalkylamine surfactant of structure (I):

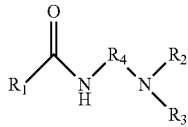

Structure (I)

wherein $R_1$ is unsubstituted alkyl having from about 5 to about 12 carbon atoms, $R_2$ and $R_3$ are each independently unsubstituted alkyl having from 1 to about 4 carbon atoms, and $R_4$ is unsubstituted alkylene having from 1 to about 4 carbon atoms; and
(c) a co-surfactant comprising an alkoxylated tertiary amine oxide surfactant selected from the group consisting of alkoxylated tertiary cocoamine oxide and alkoxylated tertiary tallowamine oxide; and
wherein the mass concentration ratio of the amidoalkylamine surfactant of structure (I) to total co-surfactant is from 5:1 to about 1:5.

17. The solution of claim 16 wherein the alkoxylated tertiary amine oxide surfactant comprises an alkoxylated tertiary cocoamine oxide.

18. The solution of claim 16 wherein the alkoxylated tertiary amine oxide surfactant comprises an alkoxylated tertiary tallowamine oxide.

19. The solution of claim 16 wherein the glyphosate component is at least 90% by weight potassium salt of glyphosate.

20. The solution of claim 16 wherein, in structure (I), $R_1$ is alkyl having an average of from about 4 carbon atoms to about 18 carbon atoms, $R_2$ and $R_3$ are each alkyl having from 1 to 4 carbon atoms, and $R_4$ is alkylene having from 1 to 4 carbon atoms.

21. The solution of claim 16 wherein the glyphosate salt is selected from the group consisting of the diammonium salt, the potassium salt, the monoethanolamine salt, and combinations thereof.

22. The solution of claim 16 wherein the solution has a cloud point that is at least about 50° C.

23. The solution of claim 16 wherein, in structure (I), $R_1$ is alkyl having an average of from about 5 carbon atoms to about 12 carbon atoms, $R_2$ and $R_3$ are each methyl and $R_4$ is n-propylene.

24. The solution of claim 23 wherein the weight ratio of glyphosate in grams acid equivalent to total surfactant in grams is from about 2:1 to about 10:1.

25. The solution of claim 23 wherein the glyphosate concentration is greater than about 360 grams acid equivalent per liter.

26. The solution of claim 23 wherein the glyphosate concentration is greater than about 480 grams acid equivalent per liter.

27. A herbicidal method for killing or controlling unwanted plants, the method comprising applying to the foliage of the unwanted plants an application mixture formed by diluting the aqueous herbicidal concentrate solution of claim 16 with water.

* * * * *